United States Patent
Waplington et al.

(10) Patent No.: US 12,072,775 B2
(45) Date of Patent: Aug. 27, 2024

(54) CENTRALIZED CONFIGURATION AND CHANGE TRACKING FOR A COMPUTING PLATFORM

(71) Applicant: ServiceNow, Inc., Santa Clara, CA (US)

(72) Inventors: Brian James Waplington, San Diego, CA (US); Hyung Kim, Kirkland, WA (US); Michael Steven Ludwig, Novi, MI (US); Ravindra Bansal, Santa Clara, CA (US); Benny Van de Sompele, Brussels (BE); Swapnesh Patel, Kirkland, WA (US)

(73) Assignee: ServiceNow, Inc., Santa Clara, CA (US)

( * ) Notice: Subject to any disclaimer, the term of this patent is extended or adjusted under 35 U.S.C. 154(b) by 17 days.

(21) Appl. No.: 18/076,736

(22) Filed: Dec. 7, 2022

(65) Prior Publication Data
US 2024/0193051 A1    Jun. 13, 2024

(51) Int. Cl.
G06F 11/14    (2006.01)

(52) U.S. Cl.
CPC ........ G06F 11/1469 (2013.01); G06F 11/143 (2013.01); *G06F 2201/84* (2013.01)

(58) Field of Classification Search
CPC . G06F 11/1469; G06F 11/143; G06F 2201/84
USPC .......................................................... 714/15
See application file for complete search history.

(56) References Cited

U.S. PATENT DOCUMENTS

| | | |
|---|---|---|
| 4,941,084 A | 7/1990 | Terada et al. |
| 5,185,860 A | 2/1993 | Wu |
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |

(Continued)

FOREIGN PATENT DOCUMENTS

| | | |
|---|---|---|
| EP | 0433979 | 6/1991 |
| EP | 1607824 | 12/2005 |

(Continued)

OTHER PUBLICATIONS

Office Action, U.S. Appl. No. 17/368,568, mailed Apr. 26, 2023.
(Continued)

*Primary Examiner* — Yair Leibovich
(74) *Attorney, Agent, or Firm* — McDonnell Boehnen Hulbert & Berghoff LLP

(57) ABSTRACT

An embodiment may involve, in response to determining that a software service satisfies a degradation criterion, generating an alert that indicates the software service and a change request specifying that configuration data used by the software service was changed in a current snapshot of the configuration data; based on the change request, determining a set of configuration changes between the current snapshot and a previous snapshot of the configuration data; and providing a representation of the set of configuration changes indicating one or more parameters that were changed in the current snapshot and one or more paths in a tree-based arrangement of the configuration data that lead to the one or more parameters that were changed in the current snapshot.

20 Claims, 20 Drawing Sheets

(56) References Cited

U.S. PATENT DOCUMENTS

| | | |
|---|---|---|
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,836,794 B1 | 12/2004 | Lucovsky |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,424,592 B1 | 9/2008 | Karr |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,908,348 B2 | 3/2011 | Kumar |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,565,108 B1 | 10/2013 | Marshall |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,560,079 B1 | 1/2017 | Lucovsky |
| 9,645,815 B2 | 5/2017 | Bennah |
| 9,928,256 B2 | 3/2018 | Cosic |
| 10,380,094 B2 | 8/2019 | Warshavsky et al. |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,892,046 B1 | 1/2021 | Harding |
| 10,944,654 B2 | 3/2021 | Rimar et al. |
| 11,089,115 B2 | 8/2021 | Garty et al. |
| 11,095,506 B1 | 8/2021 | Erblat et al. |
| 11,240,329 B1 | 2/2022 | Jain |
| 11,269,903 B1 | 3/2022 | Veeraraghavan |
| 11,321,330 B1 | 5/2022 | Pandis |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0182656 A1 | 9/2003 | Leathers |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0083398 A1 | 3/2009 | Ford |
| 2009/0088875 A1 | 4/2009 | Baier et al. |
| 2009/0228984 A1 | 9/2009 | Sterin |
| 2009/0254843 A1 | 10/2009 | Van Wie |
| 2010/0110932 A1 | 5/2010 | Doran et al. |
| 2010/0180270 A1 | 7/2010 | Williams |
| 2011/0145789 A1 | 6/2011 | Rasch |
| 2013/0117424 A1 | 5/2013 | Colyer |
| 2014/0280805 A1 | 9/2014 | Sawalha |
| 2015/0347173 A1 | 12/2015 | Shen |
| 2016/0065498 A1 | 3/2016 | Harper |
| 2016/0098462 A1 | 4/2016 | George |
| 2016/0147449 A1 | 5/2016 | Andrei |
| 2016/0357424 A1 | 12/2016 | Pang |
| 2018/0123940 A1 | 5/2018 | Rimar et al. |
| 2018/0227175 A1 | 8/2018 | Lederer |
| 2019/0034463 A1 | 1/2019 | Jeong |
| 2019/0104398 A1 | 4/2019 | Owen et al. |
| 2020/0050689 A1 | 2/2020 | Tal et al. |
| 2020/0104196 A1 | 4/2020 | Ritchie |
| 2020/0201887 A1 | 6/2020 | Bar Oz |
| 2020/0204443 A1 | 6/2020 | Bar Oz et al. |
| 2020/0314128 A1* | 10/2020 | Hild ............ H04L 63/1416 |
| 2021/0194764 A1 | 6/2021 | Badyan et al. |
| 2021/0258808 A1* | 8/2021 | Mahimkar ............ H04W 16/18 |
| 2022/0029886 A1 | 1/2022 | Hameiri et al. |
| 2022/0129415 A1 | 4/2022 | Grunwald |
| 2022/0166788 A1 | 5/2022 | Grammel |
| 2022/0179946 A1 | 6/2022 | Parameshwaran |

(56) References Cited

U.S. PATENT DOCUMENTS

| | | |
|---|---|---|
| 2022/0245257 A1 | 8/2022 | Ramesh |
| 2022/0382712 A1 | 12/2022 | Thomsen |
| 2023/0019705 A1 | 1/2023 | Zettel, II |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

ServiceNow, Quebec Now Platform Capabilities, Nov. 29, 2022.
Mark Herring, Mapping to Virtual Tables, available at: https://precisionbridge.zendesk.com/hc/en-us/articles/360002345057-Mapping-to-Virtual-Tables, last accessed Nov. 29, 2022.
Educba, Introduction to SQL Virtual Table, available at: https://www.educba.com/sql-virtual-table/, last accessed Nov. 29, 2022.
Office Action, U.S. Appl. No. 18/076,744, mailed Dec. 19, 2023.
Office Action, U.S. Appl. No. 18/076,744, mailed Jun. 6, 2024.

\* cited by examiner

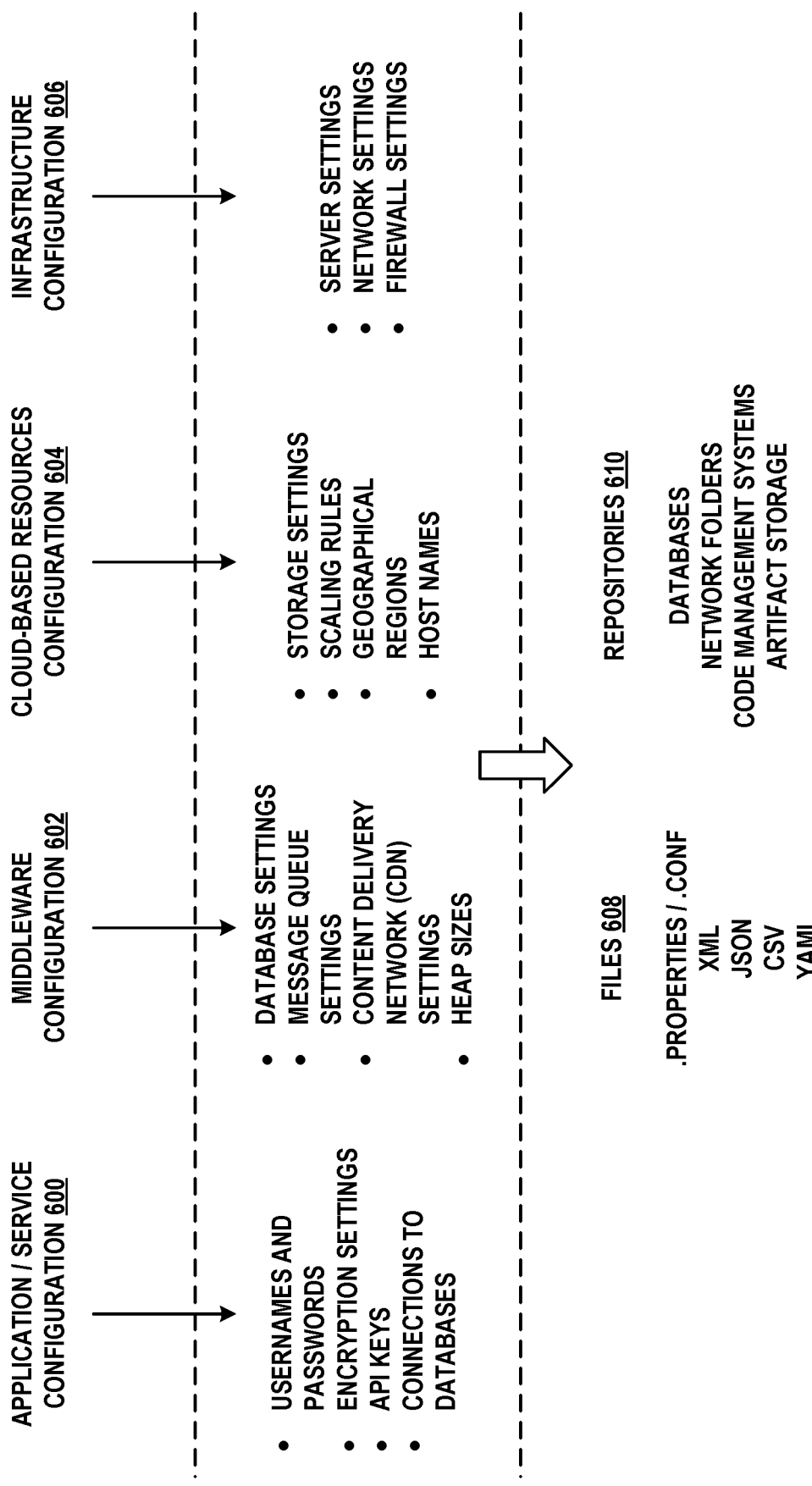

```
{
  "Now Airline Booking": {
    "Testing Environment": {
      "User Authentication Login Service": {
        "OAUTH Provider Integration": {
          "url": "https://sandbox.oauth-provider.net",
          "claims": ["address", "email", "username"]
        },
        "Custom Authentication Microservice": {
          "docker-repository": "NowAir",
          "docker-container": "now/auth",
          "docker-host": "AWS-XL1",
          "listen-url": "http://10.10.0.1/auth",
          "database": "UserAccounts",
          "database-server": "10.10.100.1",
          "database-port": 3306
        },
      },
      "Payment Gateway Service": {
        "Gateway": {
          "Merchant Number" : "Airline92122",
          "URL": "http://sandbox.example.com/payment",
          "Password": "*******"
        },
        "Payment Gateway": {
          "Vendor Number": "Airline7150",
          "URL": "https://sandbox.payment.com"
        }
      },
      "UI Webserver": {
        "domain": "testing.NowAir.com",
        "dns-server": "10.53.53.53",
        "Reverse Proxy": {
          "external-ip": "10.10.10.1",
          "internal-ip": "10.0.0.100"
        }
        "load-balancer": {
          "listen": "10.0.0.100",
          "strategy": "round-robin",
          "targets": [ "webtest1.nowair.com", "webtest2.nowair.com", "webtest3.nowair.com" ]
        },
      },
...
```

FIG. 6B

| Search | Prod/ | | | |
|---|---|---|---|---|
| ∨ Prod | Reference snapshot: Prod-v2.dpl | Target snapshot: Prod-v8.dpl | | |
| ∨ release-1.0 | ∨ Action | Name ▲ | Reference snapshot | Target snapshot  Diff on |
| logonService-V2.1 | | Path: /Prod/release-1.0/searchService-V1.0/javaConfig.json/settings (3)  Show all | | |
| ∨ searchService-V1.0 | Added | googleSearch | | enabled |
| ∨ javaConfig.json | Added | googleSearchUrl | | search.google.com |
| jvmStartupProperties | Added | googleRefIdNumber | | grefid123113 |
| ∨ settings | | | | Show all |
| ∨ featureSettings | Deleted | glide.activity.api-version | 0 | |
| ∨ analytics | | | | |
| analytics_v1 | Deleted | glide.activity.compose.allow_journal_setting s_overrides | TRUE | |
| ∨ assessment | | | | |
| assessment_v2 | Deleted | glide.activity.compose.can_post_mandatory_ fields | FALSE | |
| ∨ banner | Deleted | glide.activity.compose.use_tabs | TRUE | |
| banner_v2 | | | | Show all |
| ∨ branding | Edited | com.snc.actsub.acitivities.api.fetch.limit | 10 | 12 |
| branding_v1 | | | | |
| ∨ bsm | Edited | com.snc.actsub.actsub.activity.enable_fanout_confi g | TRUE | FALSE |
| bsm_v2 | | | | |
| ∨ cache | Edited | com.snc.actsub.actsub.activity.rate.count.limit | 5000 | 7000 |
| cache_v1 | | | | Show all |
| ∧ change | | | | |
| chart | Added | com.snc.actsub.activity.rate.v2.time.limit | | 3600 |
| ∨ communication | | | | |
| communication_v1 | Added | com.snc.actsub.actsub.activity.stream.v2.cache.ena ble | | FALSE |
| ∨ concurrency | | | | |

```
900 ⟶  {
        "Now Airline Booking/Testing Environment/User Authentication Login Service/OAUTH Provider Integration" : [
  902 ⟶    [0, "url", "https://sandbox.oauth-provider.net"], //no change
            [1, "default-token", ""], //added
            [3, "claims", "['address','email','username']", "['email','username']"] //value edited, from A to B
          ],
          "Now Airline Booking/Testing Environment/User Authentication Login Service/Custom Authentication Microservice" : [
  904 ⟶    [0, "docker-repository", "NowAir"], //no change
            [3, "docker-container", "now/auth", "now/auth-v2"], //edited
            [0, "docker-host", "AWS-XL1"], //no change
            [0, "listen-url", "http://10.10.0.1/auth"], //no change
            [0, "database", "UserAccounts"], //no change
            [0, "database-server", "10.10.100.1"], //no change
            [2, "database-port", 3306] //deleted
          ],
```

FIG. 9

CENTRALIZED CONFIGURATION AND CHANGE TRACKING FOR A COMPUTING PLATFORM

BACKGROUND

Modern computing platforms have grown large and complex, simultaneously supporting hundreds or thousands of software applications, as well as higher-level services facilitated by groups of software applications operating in conjunction with one another. As a consequence, these computing platforms can have anywhere from tens of thousands to millions of individually configurable parameters that control the operation of the platform, the software applications, and/or the services. These parameters are collectively referred to as configuration data.

SUMMARY

In many realistic scenarios, configuration data can change frequently. For example, agile or rapid software development procedures may supply updates to these parameters thousands of times per day across the platform as a whole. Some specific parameters may be changed several times per day or week as the software applications and/or their usage evolve. Further, configuration data may be stored in multiple locations within the computing platform or even external to the platform, making certain parameters challenging and time consuming to locate or otherwise identify.

This results in changes to configuration data being difficult to track and manage. As a consequence, it is believed that configuration errors (e.g., one or more parameters taking on incorrect values) are now responsible for more system downtime, defects, and faults than software coding errors.

The embodiments herein overcome these and possibly other limitations with the state of the art by providing techniques for centralizing configuration data and tracking changes to this data. Each version of the configuration data may be referred to as a snapshot. Modifications to the configuration data may be gated by change requests, where these change requests specify the files, database entries, and/or other structures impacted by each change. This allows a timeline of changes to be generated from the snapshots, and differences between the parameters of the snapshots to be determined based on the change requests. Such differences may be displayed in a tree-like hierarchy with additions, deletions, and modifications (edits) from one snapshot to another clearly indicated. Advantageously, configuration faults can be quickly identified and triaged without having to examine thousands of parameters in numerous locations.

With respect to representing these changes, many existing systems do so by storing parameters (or change to parameters) in a row of a database table. As noted, a computing platform may exhibit thousands of changes per day. Therefore, identifying changes between snapshots may involve writing thousands of such rows to the table, and then reading these rows in order to display the changes for a user.

Such a process can involve a great deal of latency, as each write or read of a row may take on the order of one millisecond. Thus, navigating and viewing large tables of changes may take at least several seconds and in some cases several minutes. To avoid these user-facing delays, the embodiments herein may employ virtual tables. This technique allows a database interface to be used to access portions of one or more files stored in a file system of the computing platform. Therefore, the changes can be written to and retrieved from the file(s) instead of a database table, which can be 10-100 times faster. Further, the output displayed to the user can be paginated so that only a small portion of the changes in the file(s) is displayed at any one time. In combination, this approach reduces main memory utilization in addition to dramatically improving the response time of the computing platform when presenting this information to the user.

Accordingly, a first example embodiment may involve, in response to determining that a software service satisfies a degradation criterion, generating an alert that indicates the software service and a change request specifying that configuration data used by the software service was changed in a current snapshot of the configuration data. The first example embodiment may also involve, based on the change request, determining a set of configuration changes between the current snapshot and a previous snapshot of the configuration data. The first example embodiment may also involve providing a representation of the set of configuration changes indicating one or more parameters that were changed in the current snapshot and one or more paths in a tree-based arrangement of the configuration data that lead to the one or more parameters that were changed in the current snapshot.

A second example embodiment may involve receiving, at a web server application, a query specifying a file, a block number of a block of data within the file, and a block size, wherein the file includes entries representing differences between snapshots of configuration data; identifying, based on the block size, the block of data within the file; storing the block in a non-transitory memory that is accessible to the web server application; and in response to the query, transmitting, by the web server application, a set of the entries within the block formatted for display in a list component of a graphical user interface.

A third example embodiment may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6A provides types of configuration data, how the configuration data is stored, and where the configuration data can be stored, in accordance with example embodiments.

FIG. 6B provides a simplified set of configuration data for a software service, in accordance with example embodiments.

FIG. 7E depicts a user interface displaying further changes to configuration data, in accordance with example embodiments.

FIG. 7F depicts a user interface displaying an alternative view of changes to configuration data, in accordance with example embodiments.

FIG. 9 depicts a partial difference comparison file, in accordance with example embodiments.

DETAILED DESCRIPTION

Figure 1:
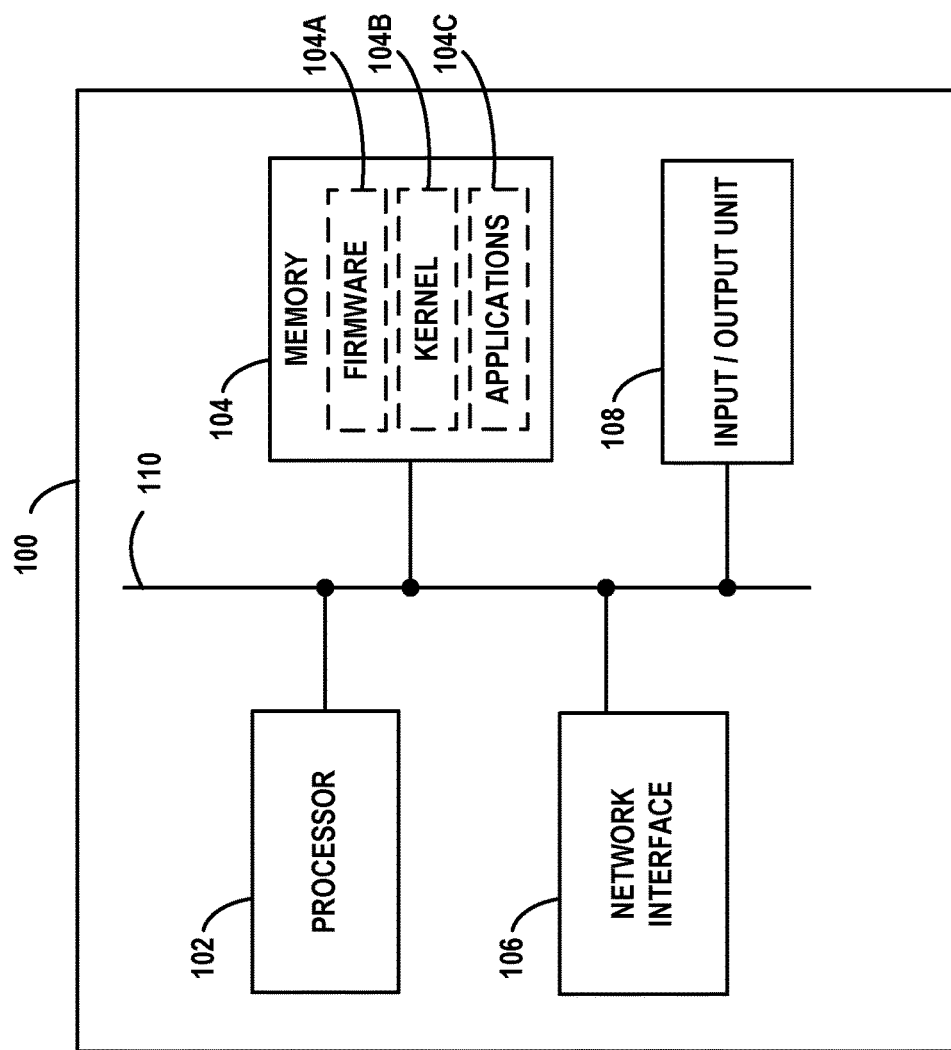
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
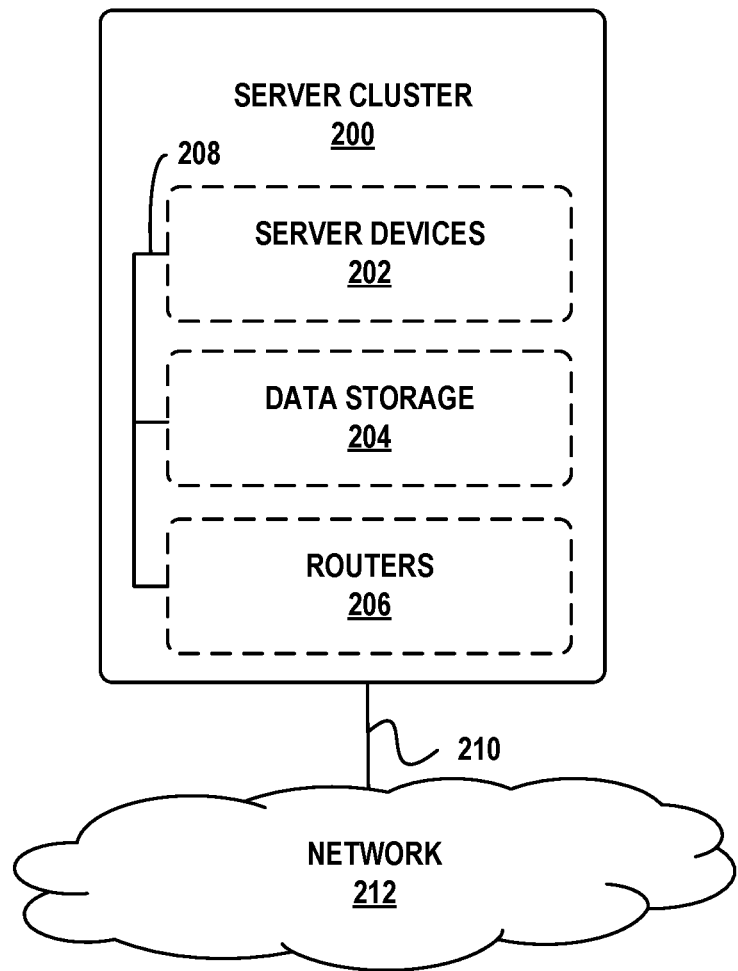
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
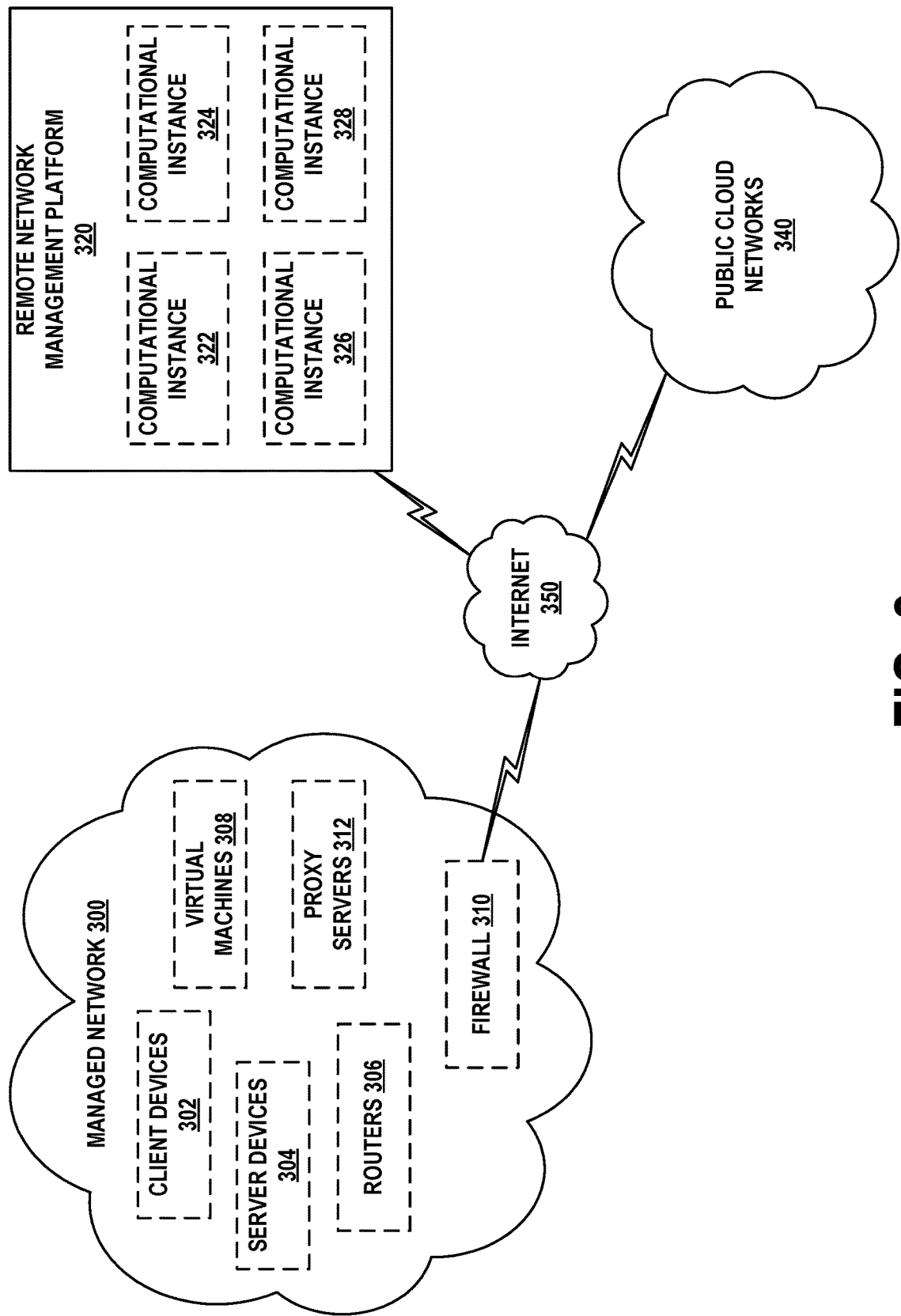
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
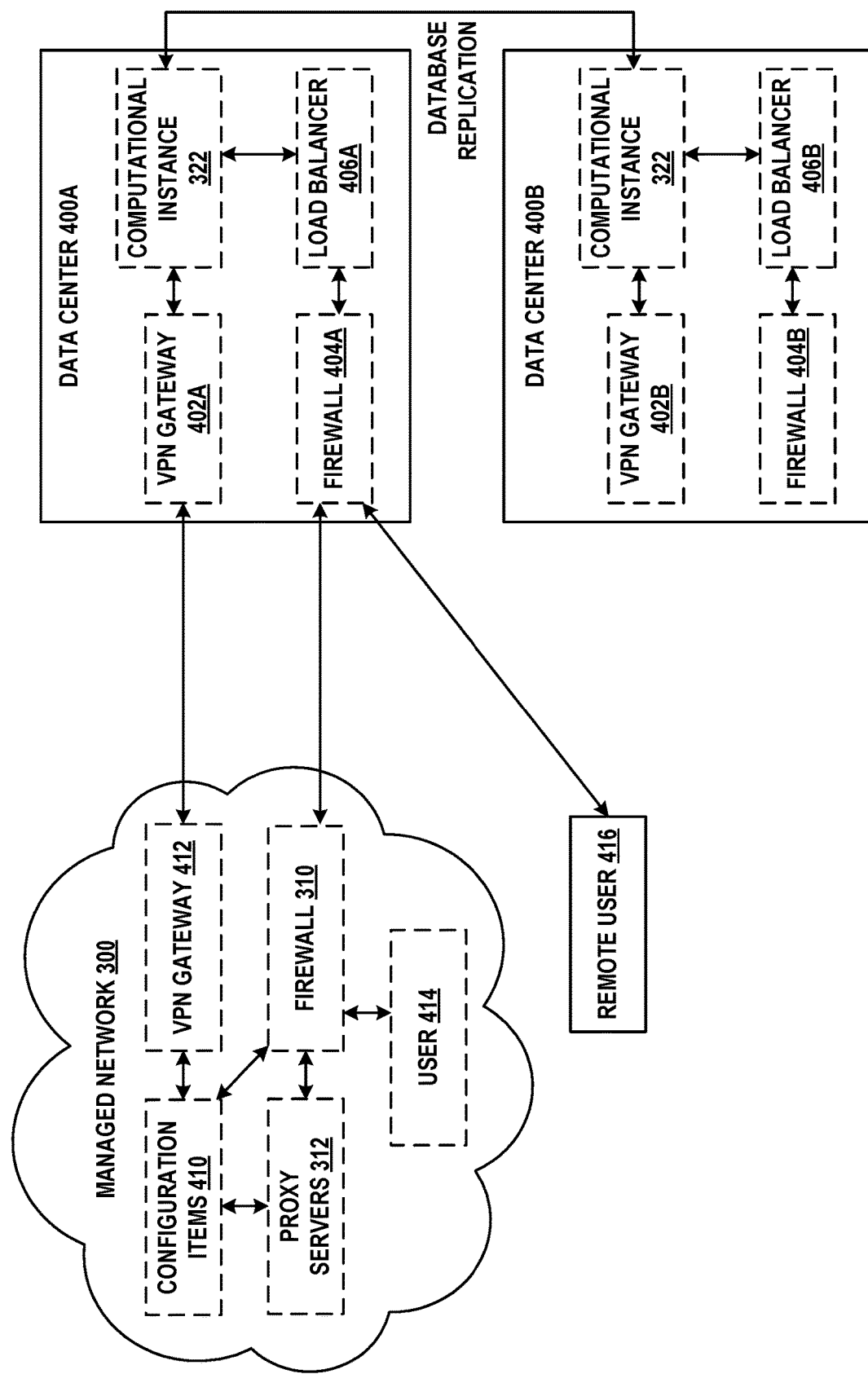
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
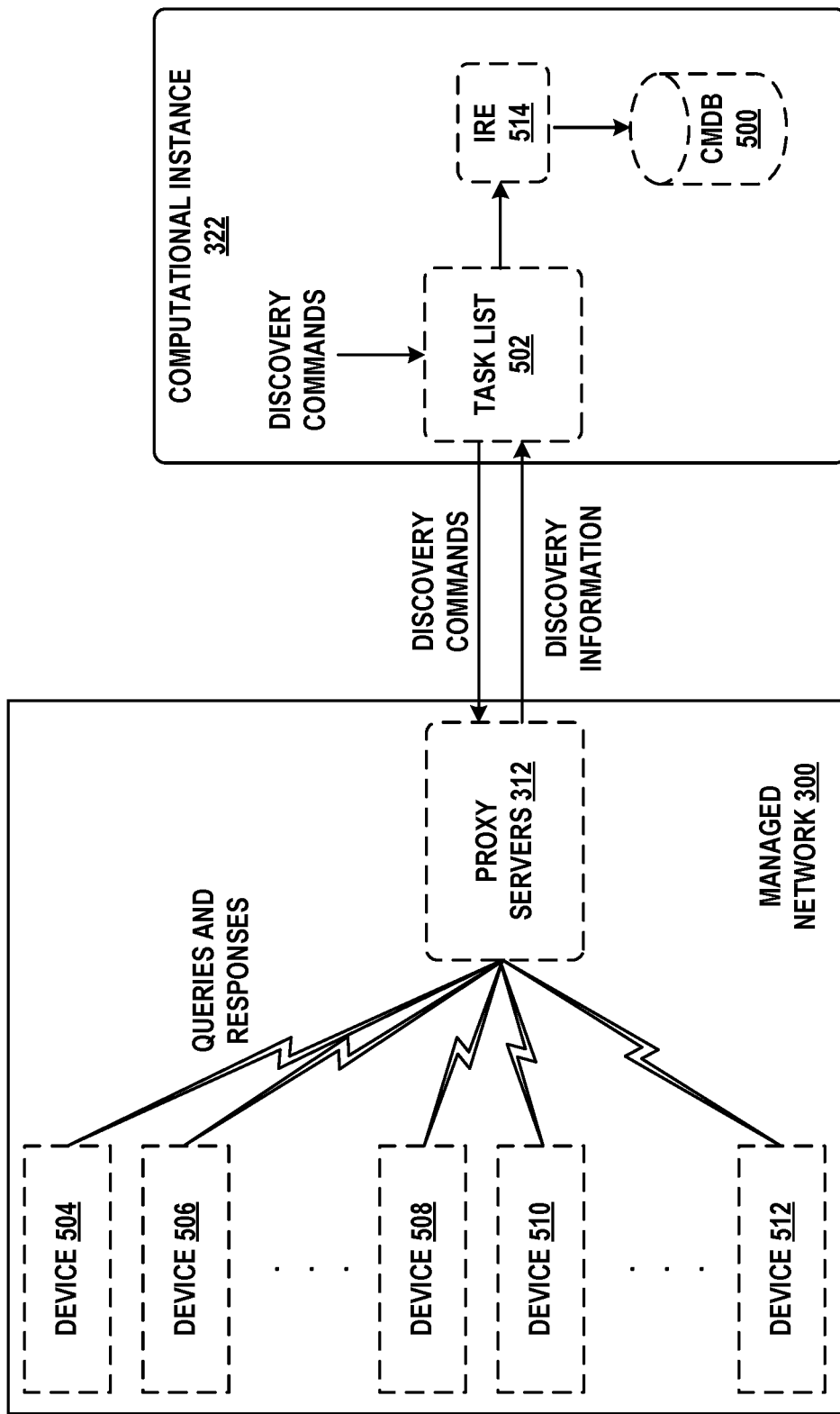
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Determining Changes to Configuration Data

As described above, a remote network management platform (such as remote network management platform 320) may support a vast array of software applications and services. Each of these may have its own configuration data, which could reside by default in one or more files or database entries within or outside of the platform.

The configuration data may be made up of sets of parameters, where a parameter may be a key-value pair, one or more alphanumeric values, a file, or some other type of content. For purposes of discussion herein, it may be assumed that parameters take the form of key-value pairs but other parameter forms may be employed. An example of a key-value pair is "ip-address: 10.0.177.15", where the key is the text "ip-address" and the value is the IP address "10.0.177.15". Key-value pairs can be stored in various types of structured or unstructured text files, database tables, and so on.

A. Arrangements of Configuration Data

FIG. 6A illustrates an example of types of configuration data, as well as how and where it might be stored. Application/service configuration 600 may include configuration data for specific software applications and/or services. These may be one or more of usernames and passwords, encryption settings, application programming interface (API) keys, or connections to databases. Middleware configuration 602 may include configuration data of features built into the remote network management platform that may be employed by the software applications and/or services. These may be one or more of database settings, message queue settings, content delivery network (CDN) settings, and/or heap sizes. Cloud-based resources configuration 604 may include configuration data relating to one or more public cloud network services used by the software applications and/or services. These may be one or more of storage settings, scaling rules (e.g., for processing, storage, and network capacity), geographical regions in which the cloud-based resources are located, and/or host names relating to these resources. Infrastructure configuration 606 may include configuration data directed to the operation of computing devices within the remote network management platform. These may be one or more of server device settings, network settings, firewall settings, and so on. For instance, these settings may include IP address assignments, domain name assignments, workgroup assignments, etc.

All of this configuration data may be stored in different ways spread across the remote network management platform, one or more public cloud networks, and/or other locations. For example, some of this configuration data may be stored in files 608, which may include unstructured text, structured text, or be other types of files—e.g., .properties, .conf, XML, JavaScript Object Notation (JSON), comma-separated-value (CSV), and/or Yet Another Markup Language (YAML) files. Alternatively or additionally, some of this configuration data (parameters and/or files) may be stored in repositories 610, which may include databases (e.g., specific database tables), network folders, source code management systems, and/or artifact storage.

In some cases, configuration data may be stored in a hierarchical tree-like structure. For instance, JSON and XML files are hierarchically structured in a fashion that is directly analogous to a tree. In these types of files, objects are either an element (e.g., a key-value pair that is like a leaf of a tree) or a container of other objects (e.g., a block of elements that is like a root or intermediate node in a tree).

As a concrete example, an airline booking web site can contain many nodes of application and service configuration data, such as a custom ticket reservation application, a user relations management component, a payment gateway service, a user interface, a series of webservers that provide content to the user interface, authentication microservices, database servers, load balancers, and internal network routing policies that all need to be configured properly in order to combine and operate seamlessly as the airline booking application service. As such, the configuration data of a software service may be extensive and number in the thousands of nodes storing tens of thousands of configuration key-value pairs in a tree-like hierarchy. A simplified example set of JSON configuration for such a software service is shown in FIG. 6B.

The challenges of maintaining such configuration data is not only that the data is complex (tens of thousands to millions of parameters), but also that changes to it are frequent. For example, a remote network management platform may support hundreds or thousands of software applications and services, some fraction of which may be under continuous development processes, such as various types of agile programming models. As such, new versions of these applications may be deployed into a production environment every few days, or even several times in one day.

The teams of software engineers developing and testing these applications may make changes to the configuration data of their applications, but may also modify that of other applications, as well as that of middleware and/or infrastructure. Thus, to fix a software defect or to deploy a few feature, one team of software engineers may make changes to configuration data that affects the software applications of some or all other teams. Such changes may cause at least some of these other software applications to change behavior or to fail in various ways.

Further, each set of configuration data may be placed in files 608 and/or repositories 610 that are disposed throughout numerous locations. This leads to weak access restrictions for configuration data and the coordination of changes being difficult if not impossible. The result is that changes can be uncontrolled, can have no traceability, and cannot be easily audited.

As a consequence, a major root cause of software application and service outages is now errors in configuration data. In some estimates, these errors are even more prevalent and more impactful than coding errors in the software applications. Some notable configuration-related outages have taken entire web sites offline or rendered them impractical to use for hours or even days. Due to the aforementioned limitations, these outages are difficult to troubleshoot because narrowing down the configuration changes that may have caused the outage is akin to looking for a needle in a haystack across multiple files and repositories.

Therefore, any improvement in how configuration data is managed, presented, viewed, and manipulated such that outages are less likely to occur and faster to resolve would be beneficial.

Figure 6C:
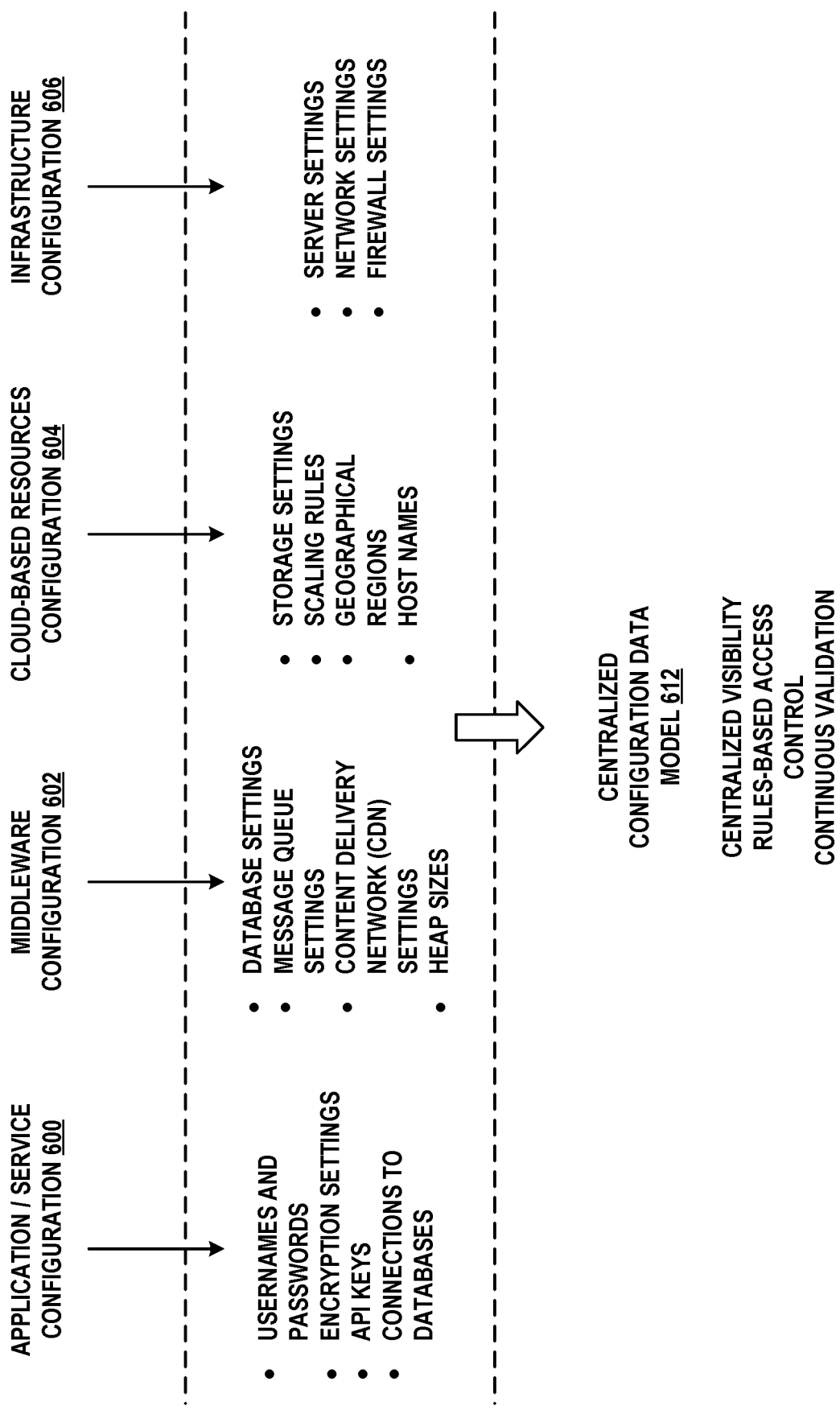
FIG. 6C illustrates centralized storage of configuration data, in accordance with example embodiments.

The embodiments herein provide such improvements. As shown in FIG. 6C, the embodiments may involve consolidating the configuration data into a centralized configuration data model 612, which may be stored in a single location. This facilitates centralized visibility into configuration data (so that software engineers and operations engineers do not have to spend inordinate amounts of time just to find relevant files or repositories). This also facilitates rule-based access control, in which sets of access control lists (ACLs) or other mechanisms define which users can make what changes to certain parameters at what points in time. This further facilitates continuous validation in which automated processes scan the configuration data to identify possible errors, misconfigurations, or inconsistent groups of parameters. Such validation may be based on rules that define valid and/or invalid parameters or combinations of parameters, or based on logic that is more complex.

One or more such ACLs may also control the visibility to nodes, keys, or values on a per-user or per-user-group basis. As a result, some users may be unable to view certain branches in the tree, or to observe certain masked values (like passwords) while still maintaining the ability to know that the masked value was added, edited, deleted, or remains unchanged.

As noted above, snapshots refer to versions of the configuration data. In some cases, a snapshot may refer to the entirety of the configuration data, and in others only a subset of the configuration data (e.g., the part of the configuration data used by one or more specific software applications).

As an example, suppose that a particular software application includes parameters in the configuration data that determine which search engine that is to be employed for user search requests. It may be desirable to support multiple search engines and have the software application be able to use or switch between any of them.

In possible embodiments, the parameters may be updated to include a new search engine. For example, parameters to specify the Google search engine may include the following key-value pairs: "googleSearch: disabled", "googleSearchURL: www.google.com", and "googleRefldNumber: grefID123113".

First, a change request may be made, asking for the new search engine to be added. This change request may come from a user or an application, and may be added to a database of change requests stored by the remote network management platform. Based on this change request, a software developer may add the new parameters to a configuration file of the software application. Next, a new version of the software application is built, incorporating these parameters into its configuration file, as well as any changes to the code of the software application that facilitates use of the new search engine. Then, the package (e.g., the new versions of application and its configuration data) may undergo automated testing procedures. Such testing may involve making sure that the configuration file is syntactically correct and properly formatted.

Assuming that these tests pass, the configuration file may be uploaded to centralized configuration data model 612. A snapshot of the configuration file is made, where the snapshot is the current version of the configuration file. The snapshot goes through a validation process and is then published (made available) by way of a web interface of centralized configuration data model 612.

After the snapshot is available, a change control process is undertaken to review and either approve or reject the change request (as well as the associated snapshot). The change control process may include manual review from a software developer or automated review. For example, the results of the validation process may be reviewed to ensure that validation was successful. Once the change request is approved, the package can be deployed into an environment (e.g., production use by end users of the remote network management platform, testing use by software testers, or development use by software developers).

B. Example Graphical User Interfaces

Figure 7A:
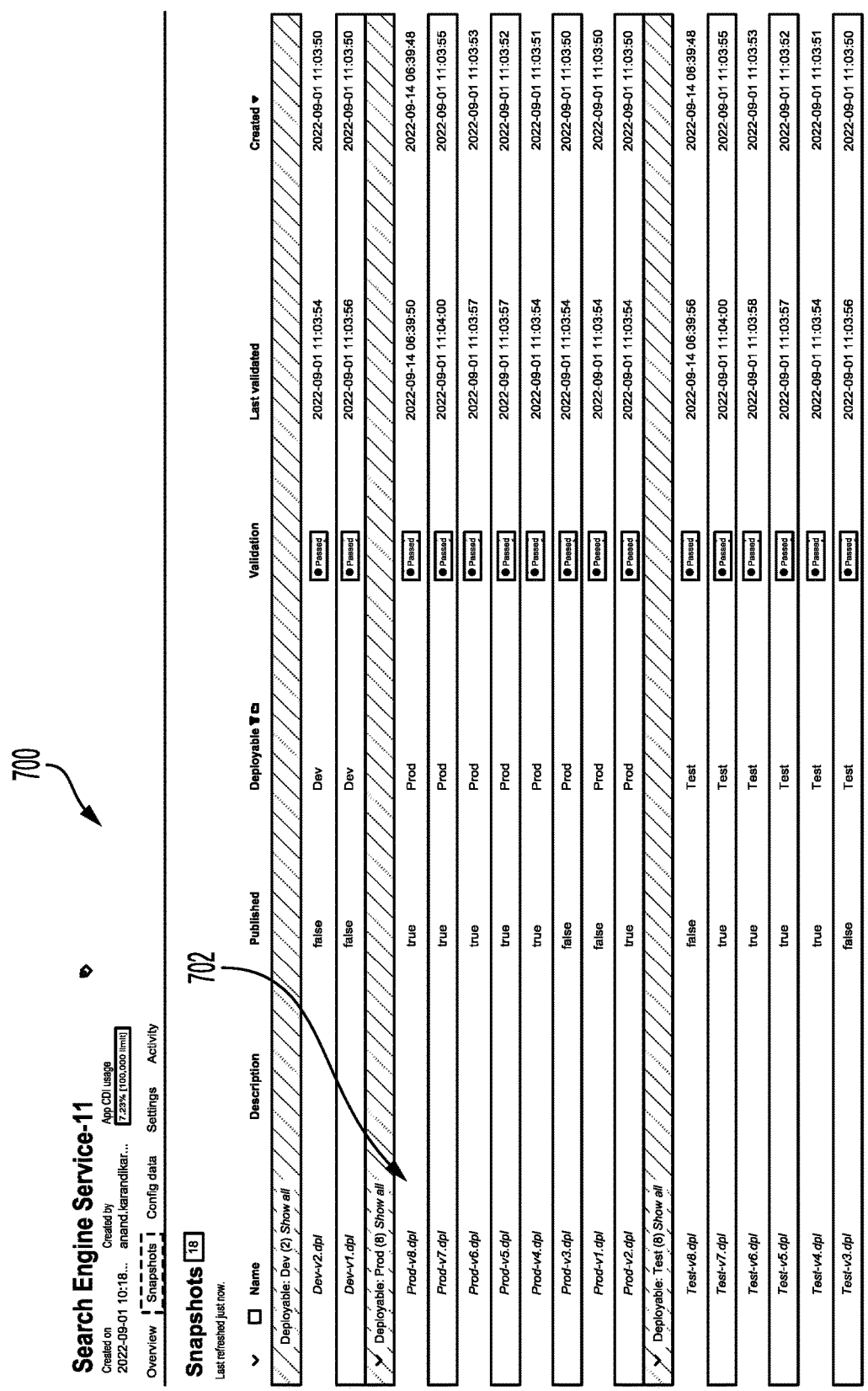
FIG. 7A depicts a user interface displaying a list of snapshots, in accordance with example embodiments.

For purposes of further illustration, FIG. 7A depicts a listing 700 of available snapshots of configuration data organized by environment, where "prod" indicates production, "test" indicates testing, and "dev" indicates development. This listing may be obtained by way of a web interface of the remote network management platform, such as a web interface of centralized configuration data model 612.

Here, it is assumed that the snapshot prod-v8.dpl 702 is the new snapshot with the addition of parameters specifying the Google search engine. Notably, the web interface specifies whether each snapshot is published, into which environment it is deployable, whether it has been validated, and timestamps of its creation and most recent validation. As shown, prod-v8.dpl 702 is the most recent production snapshot.

Continuing with this scenario, suppose that the package associated with snapshot prod-v8.dpl 702 is deployed in the production environment. This environment may be configured to produce alerts when various types of problems or potential problems are detected. For example, the environment may produce an alert when no searches have been conducted for the last 15 minutes (given that thousands of users are expected to be using the search service, such an event is expected to be quite rare).

Figure 7B:
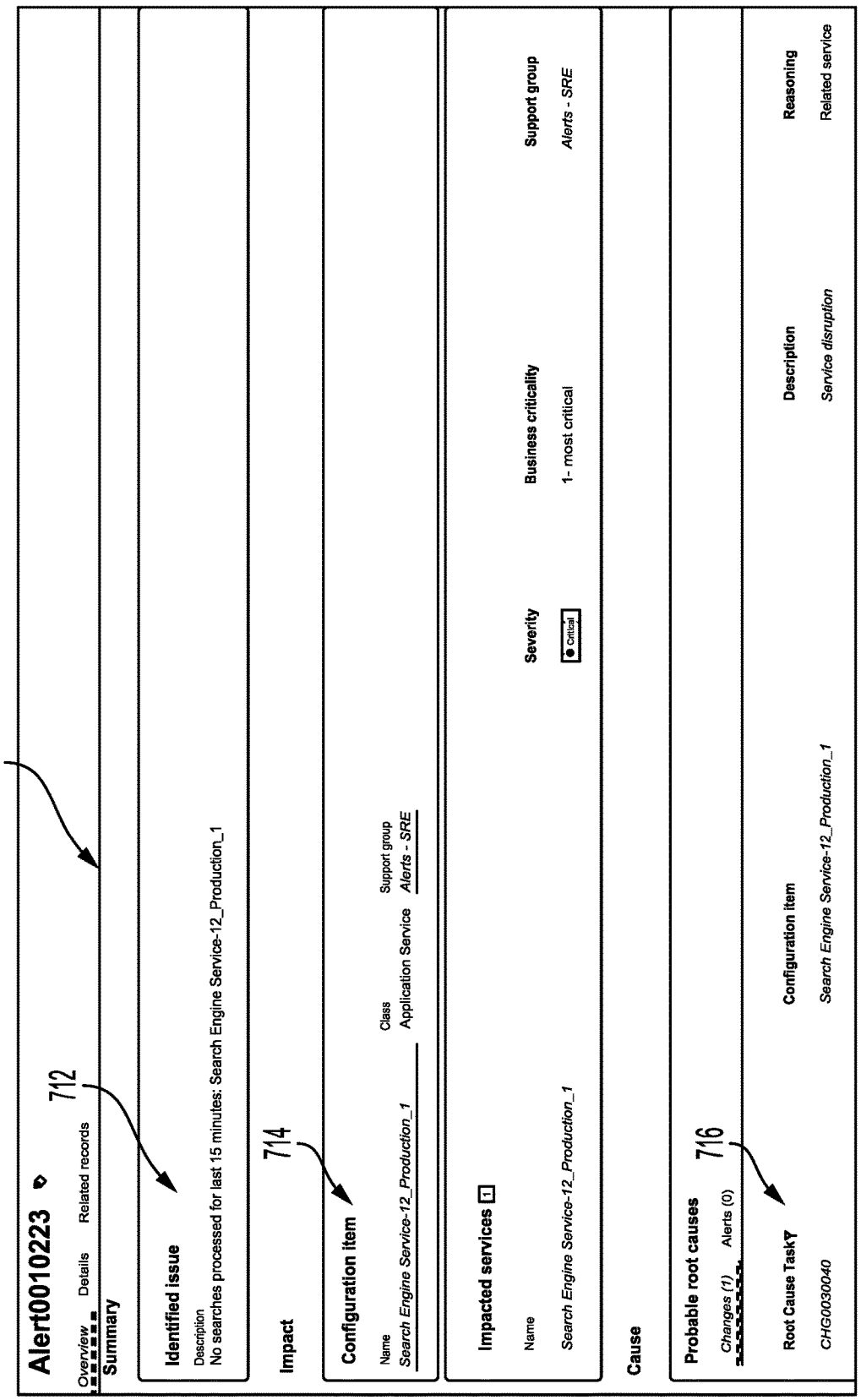
FIG. 7B depicts a user interface displaying an alert, in accordance with example embodiments.

As a result, the remote network management platform may generate an alert. This alert may be sent to one or more system reliability engineers, who are tasked with keeping the platform and its application and services operating correctly. As an example, FIG. 7B depicts a web interface 710 into an alert management application of the remote network management platform. Alert0010223 is shown, which includes identified issue 712 ("No searches processed for last 15 minutes"), impacted configuration item 714 ("Search engine service—production"), and probable root cause 716 (related to the change request CHG0030040). Here, it is assumed that change request CHG0030040 was: (i) the basis for changing the configuration file to include the Google search engine, and (ii) related to impacted configuration item 714.

In many realistic scenarios, there may be multiple change requests that are listed under probable root cause 716. Further, it may not be clear from the content of these change requests which parameters of the configuration data was changed. Thus, the root cause analysis process may require that the system reliability engineer manually review each change request and then work with software developers to first identify the relevant configuration snapshots, identify changes between these snapshots, and determine whether these changes resulted in the apparent service outage. In all but the simplest of situations, this process is complex and can take hours or days.

The embodiments herein overcome these drawbacks due to the association between change requests and snapshots. Notably, change request CHG0030040 resulted in deployment of snapshot prod-v8.dpl 702. Therefore, the new configuration parameters introduced in snapshot prod-v8.dpl 702 can be rapidly and easily identified.

Figure 7C:
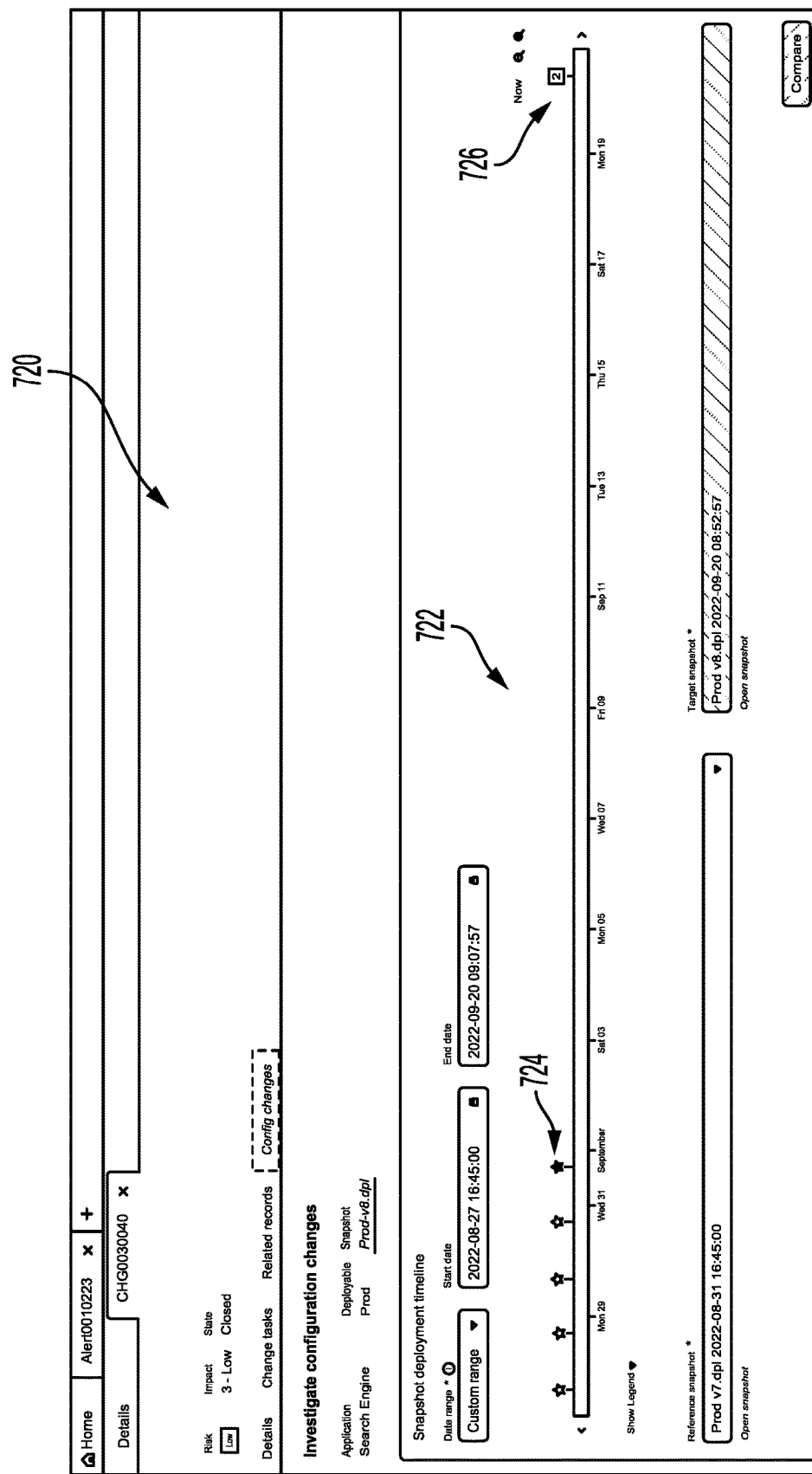
FIG. 7C depicts a user interface displaying a timeline of snapshots relating to a change request, in accordance with example embodiments.

To that point, FIG. 7C depicts user interface 720 showing snapshot deployment timeline 722, on which several snapshots are shown and each may be selectable. FIG. 7C shows that reference snapshot 724 (representing the most recent previously-deployed snapshot) and target snapshot 726 (representing currently-deployed snapshot prod-v8.dpl 702) have been selected. In general, the range of times shown on timeline 722 can be broadened or narrowed, and any one or two snapshots thereon can be selected. Further, the web interface may automatically display the last several deployed snapshots (e.g., 2, 3, 5, or 10 snapshots).

Figure 7D:
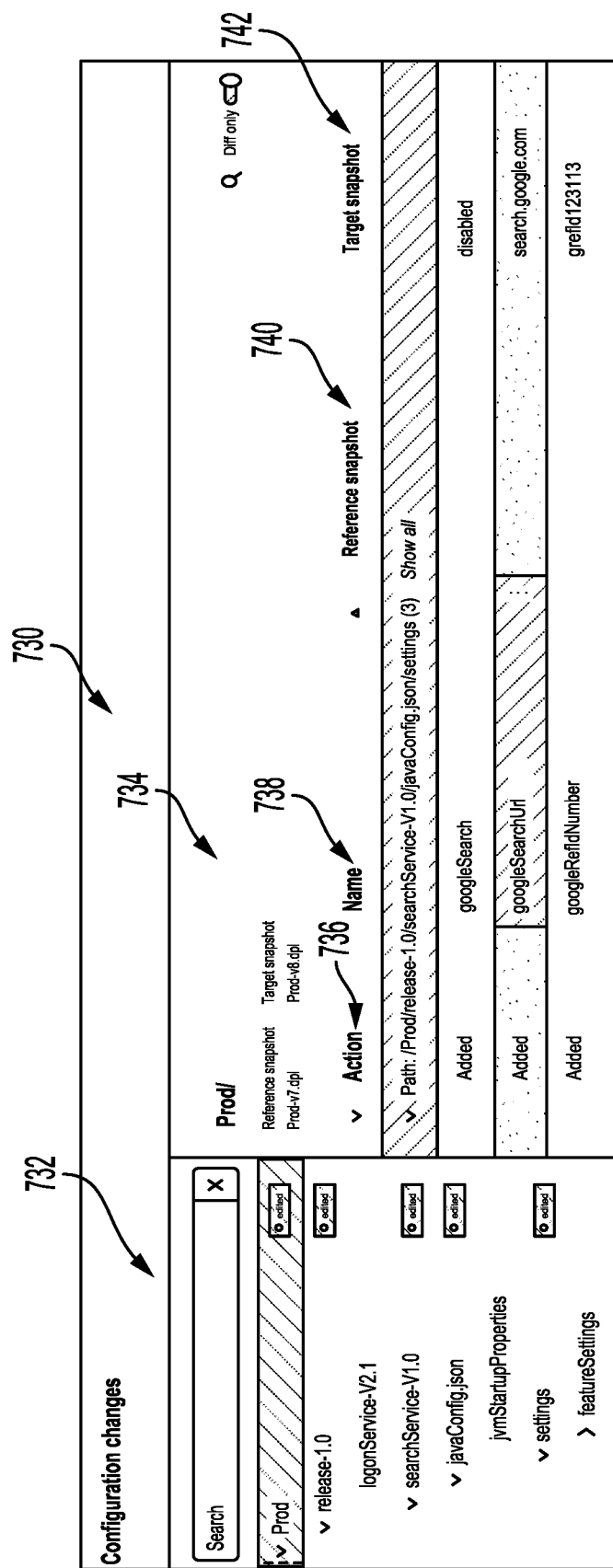
FIG. 7D depicts a user interface displaying changes to configuration data, in accordance with example embodiments.

FIG. 7D displays the differences between the two selected snapshots (e.g., reference snapshot 724 and target snapshot 726). In this figure, user interface 730 may be part of user interface 720 (e.g., one would reach user interface 730 by scrolling down from user interface 720) or a separate user interface.

Regardless, pane 732 displays a tree-based arrangement of changes between these snapshots, in which each node is selectable. Selecting such a node may cause pane 734 to display any changes between the two snapshots that are within or under the node. For example, in pane 732, the node "Prod" is selected. Thus, all changes under that node are shown in pane 734. These changes are labeled with a path through the tree to the node(s) where the changes exist. For instance, the displayed path "/Prod/release-1.0/searchService-V1.0/javaConfig/json/settings" indicates that there are three changes between the two snapshots, and that these changes appear in the settings node (i.e., the configuration file that was edited to add the Google search engine).

Pane 734 shows in tabular form, for each parameter changed, the associated action 736 (e.g., added, edited, removed, no change), the key (name) of the parameter 738, its value 740 from the reference snapshot, and its value 742 from the target snapshot. In cases where the reference snapshot or the target snapshot does not include a parameter, the associated entry may be blank. For example, in FIG. 7D, the three parameters were added to the target snapshot, so they are not shown in the reference snapshot.

Pane 734, as shown, uses a list component of the graphical user interface to display rows of actions, parameter key (names), and parameter values. Nonetheless, other types of user interface components may be used to display such information.

From this user interface, a system reliability engineer or software developer can easily identify which parameters changed between relevant snapshots. This dramatically narrows the amount of searching that such an individual needs to do in order to find the root cause of the outage. Finding the differences between the content of two files is not particularly difficult—the challenging part of root cause analysis is to identify the two files to compare. The embodiments herein make doing so a process that takes only seconds or minutes rather than hours or days.

To that point, the added parameter "googleSearch" has a value of "disabled" in FIG. 7D. This indicates that the Google search engine has not been enabled in the production environment, which would explain why the alert was generated. A software developer can create and deploy a new snapshot with the parameter "googleSearch" having a value of "enabled" in order to allow the Google search engine to be used.

For sake of example, FIG. 7E depicts user interface 750, which is a variation on user interface 730. User interface 750, however, includes multiple changes to parameters at multiple nodes in the tree-based arrangement. Further, these changes include additions, deletions, and edits to both parameters and nodes. In addition, user interfaces 730 and 750 may support features that display parameters for which changes were not made. This might be helpful if a change of a parameter was expected, but did not take place for some reason. Moreover, these user interfaces may support searching amongst and sorting of parameters displayed.

Figure 7F:
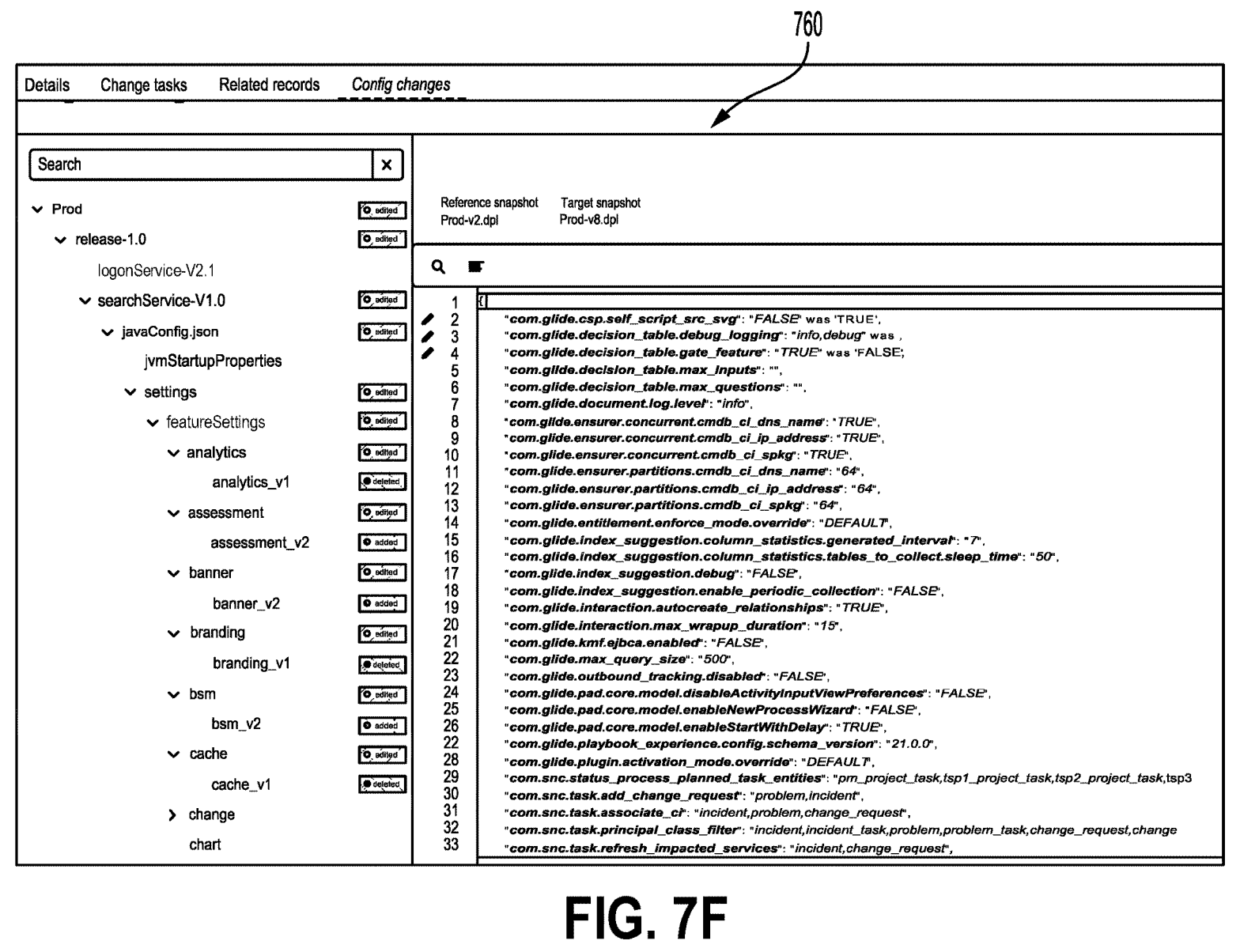

FIG. 7F depicts a further optional user interface 760 that is an alternative view of the changes made to parameters. Instead of a traditional view of difference between files shown in two adjacent text boxes, here each parameter name (key) is shown with its previous and new values (where applicable). Thus, for instance, FIG. 7F shows that the key "com.glide.csp.self_script_src_svg" had a value of "TRUE" in the reference snapshot and has a value of "FALSE" in the target snapshot. Conversely, the value of the key "com.glide.decision.table.max_inputs" did not change between these snapshots, as it is shown with only one value. Added, deleted, and edited parameters may also be highlighted in various ways (e.g., with special fonts, colors, or associated characters or icons) so that they draw the user's attention.

This view may be superior to that of the traditional adjacent text boxes, because the changes here are largely to values and not keys. Thus, it is hard for the user to identify changes in the adjacent text boxes, but easy for the user to do so in this layout.

C. Example Operations

Figure 8:
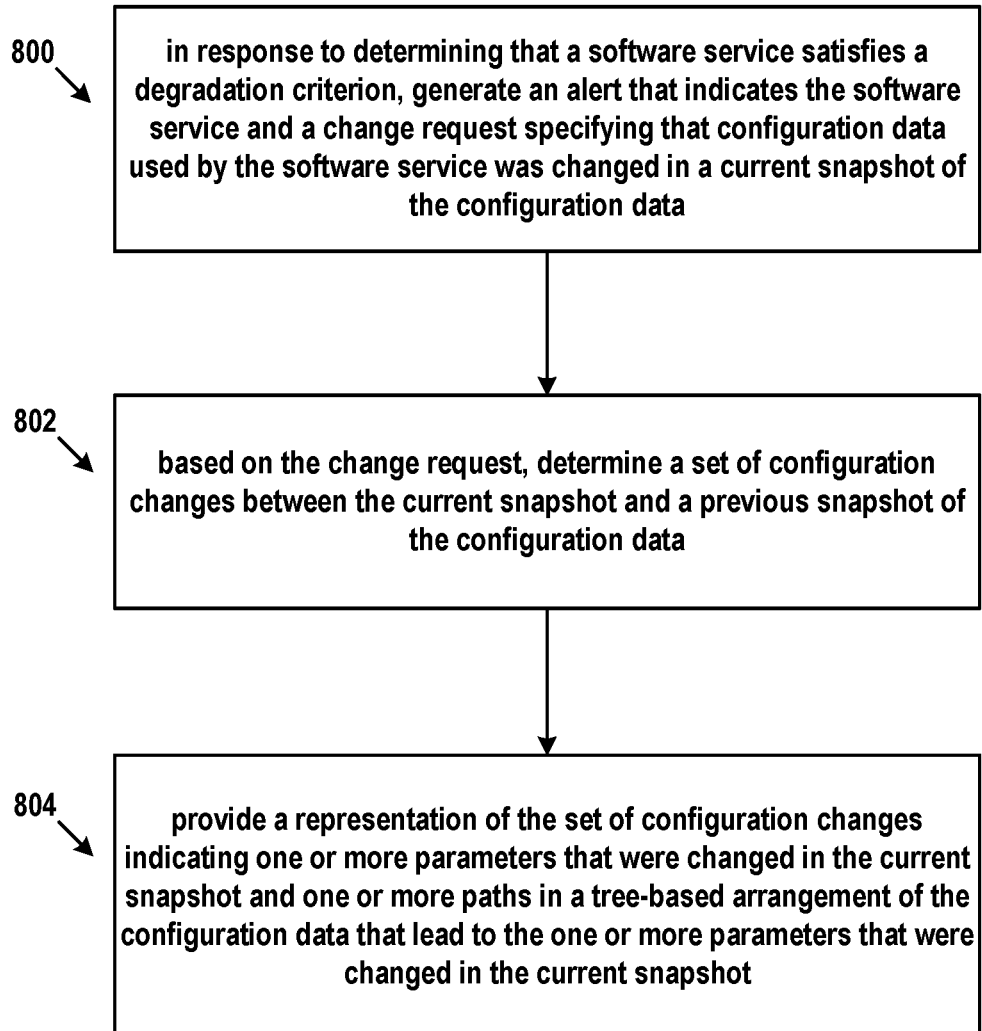
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 8 may be simplified by the removal of any one or more of the features shown therein. Further, these embodiments may be combined with features, aspects, and/or implementations of any of the other figures or otherwise described herein.

Block 800 may involve, in response to determining that a software service satisfies a degradation criterion, generating an alert that indicates the software service and a change request specifying that configuration data used by the software service was changed in a current snapshot of the configuration data.

Block 802 may involve, based on the change request, determining a set of configuration changes between the current snapshot and a previous snapshot of the configuration data.

Block 804 may involve providing a representation of the set of configuration changes indicating one or more parameters that were changed in the current snapshot and one or more paths in a tree-based arrangement of the configuration data that lead to the one or more parameters that were changed in the current snapshot.

In some embodiments, determining the set of configuration changes between the current snapshot and the previous snapshot of the configuration data is in response to receiving a selection of the current snapshot and the previous snapshot.

In some embodiments, the software service is supported by one or more software applications, wherein the one or more parameters that were changed in the current snapshot of the configuration data are used by the one or more software applications.

In some embodiments, determining that the software service satisfies the degradation criterion comprises detecting one or more of: an outage impacting the software service, reduced performance of the software service, or processor or memory utilization exceeding a threshold value.

In some embodiments, the alert is one of a plurality of alerts, stored in an alert database, related to detected technical problems affecting one or more of a plurality of software services.

Some embodiments may further involve providing, to a client device by way of a graphical user interface, a representation of the alert that specifies the software service and the change request.

In some embodiments, determining the set of configuration changes comprises: providing, to the client device, an adjustable timeline of a plurality of snapshots including the current snapshot and the previous snapshot of the configuration data; receiving, from the client device, a further selection of the current snapshot and the previous snapshot; and determining, as the one or more parameters, those that were changed between the previous snapshot and the current snapshot.

In some embodiments, each of the one or more parameters that were changed in the current snapshot of the configuration data is represented as a key-value pair comprising a key that uniquely identifies a respective parameter and a value of the respective parameter.

In some embodiments, each of the one or more parameters that were changed in the current snapshot of the configuration data is marked as either being newly added to the configuration data, removed from the configuration data, or edited within the configuration data.

In some embodiments, the representation of the set of configuration changes also indicates additional parameters that were not changed in the current snapshot of the configuration data.

In some embodiments, the current snapshot of the configuration data is deployed in a production environment, wherein the previous snapshot is a snapshot of the configuration data that was most recently deployed in the production environment prior to deployment of the current snapshot

VII. Using Virtual Tables with Pagination to Display Changes to Configuration Data With centralized configuration data model 612 in place, changes to configuration data are tracked and stored in ways similar to that source control management systems such as Git, Subversion (SVN), concurrent versions system (CVS), and team foundation server (TFS). For instance, centralized configuration data model 612 tracks changes, user who committed each change, and the ability to reconstruct the state of the configuration data before and after such changes. But the embodiments herein involve managing and presenting such changes in a new fashion that is specifically drawn to configuration data.

Changes are tracked for debugging, traceability, and auditing purposes. Versions of the configuration data can be imported from files, but also from changes made as part of a change request process. These changes to the configuration data can take the form of change sets that are committed to the configuration tree of one or more software services and/or deployable modules that may be used by such services.

Once committed, changes are incorporated into centralized configuration data model 612. Centralized configuration data model 612 may be, for example, stored in a relational database such that each element in the configuration data is represented as an row in a database table representing a node in the tree-like structure of the configuration data. The node may reference the change set that corresponds to the node (i.e., the change set that caused creation of the node), and may be reached (addressed) by a unique path of nodes from the root to this node. Particularly, a new release of the configuration data may reference a specific source control change set that can be used to determine the effective snapshot of configuration data for that release.

These change set commits are additive to the configuration data. Thus, they are non-destructive, meaning an added, edited, or deleted entry becomes a new instance of a node and supersedes a node in a previous version of the tree-like structure. But this does not alter the previous version of the node so that history is preserved. For example, a node that was deleted from the configuration data by way of a change set still exists and can be observed as a deleted node. From the nodes of this tree-like structure (deleted and non-deleted), snapshots of the configuration data at various points in time can be generated. These snapshots can be released to apply the current snapshot to the configuration items of the software service.

Further, a snapshot of configuration data at a point in time or for a particular change commit can be reassembled for auditing and/or review. Reassembling a snapshot of a specific point in time and determining the nodes of the effective configuration data tree-like structure for that snapshot involves identifying change commits for the tree-like structure and determining the effective version of nodes in the tree for the point in time.

As noted above, changes to the configuration data can lead to software service degradation, or even non-functioning software services. Monitoring software on the platform may raise an alert, such as unusually high processor utilization and/or slow response times. The alert may identify the impacted configuration item(s) being monitored, the related software service, and/or other components related to the configuration item(s). From the alert, the current snapshot of configuration may be deduced because the configuration data of the snapshot contains the configuration item identified by the alert. From the current snapshot, a history of configuration changes and effective snapshots of the committed and deployed configuration changes can be reassembled into a timeline of configuration snapshots used to pinpoint a configuration change that caused the software service degradation.

Visualizing the differences between two versions of code is a feature of source control management systems, and is performed on a textual basis, line-by-line or character-by-character. In contrast, the differences between two versions of configuration data, A and B, involves identifying node differences between the tree-like structures of two snapshots of A and B. The changes can then be categorized as added (a node's path did not exist in A but exists in B), deleted (a node's path does not exist in B but did exist in A), edited (a node's path exists in A and B but has a different value in B), or no-change (identical node paths and values exist in A and B).

This differs from a typical source control code comparison due to the context of the tree-like structure. A node in a configuration data tree-like structure may span several lines of text, where not every line of text representing a node may have a text-based difference. In effect, some lines of text in the two snapshots may be identical, yet be lines of text belonging to a node that did change. A source control system such as Git may identify differences using just line and text-based comparisons, and may highlight added and deleted lines of text. Furthermore, the source control system may consider a line as not having changed even though that line is part of a node that did change. The source control system visual differencing shows added and deleted lines of text between two version of a code file, and omits any lines that were not changed.

The differences between snapshots of configuration data are contextual with respect to the nodes of the configuration data. For example, even if a parent node has not changed, a child node of the parent node may have changed. This results in the parent node having a difference category of an edit.

The difference category no-change is also more informative than that of source control systems. For instance, when a node has a difference category of no-change, that also means that none of its child nodes have changed. Thus, in the tree-like structure, the context of where a node is in the tree and the difference category of the node's sibling, descendant, and ancestor nodes provides additional insight into pinpointing the changes in configuration data that caused an alert. Trying to apply source control code text-and-line comparisons will cause this context to be lost and can even result in a line change being attributed to the wrong node.

The difference comparisons can be done by a configuration data management software application, and calculated between two snapshots of configuration data of the configuration item related to the alert. These snapshots can contain tens of thousands of nodes in two tree-like hierarchies. The difference is a merged tree structure containing all nodes of both snapshots. If a node exists in both snapshots as determined by its path, then it is considered the same node in the merged tree. In such a node, the difference comparison of each key-value pair is performed as well, resulting in one of the four states described above (added, deleted, edited, no-change) being determined for the node.

A. Storage of Difference Comparisons

Difference comparisons can be performed by loading two or more snapshots into main memory and then determining the per-node differences between these snapshots. However, results are ephemeral and are typically specific to just the one user (the user requesting the difference comparison) and that user's access permissions (each user may only see parts of the tree to which they have access). The results may not even be relevant for the duration of the entire user session, as the user may alter the selection of the snapshots for comparison.

Results may also be in the tens of thousands of nodes. Thus, storing these results in a database table is prohibitive and computationally costly due to the relative slowness of database reads and writes. Presenting these results on a user interface in a responsive fashion (e.g., in less than a 1-2 seconds) may be impossible due to the volume of data. Further, the transient nature of the difference comparisons also makes employing permanent storage in a database table wasteful, since those tens of thousands of results then have no purpose and need to be deleted from the database once the user is done viewing them.

Thus, performance and efficiency suffer when storing large numbers of short-lived results in a database table. This is compounded in high availability database configurations where every database operation is replicated to a secondary database. Inserting and deleting such a high volume of data over a short duration can back up replication and ultimately risk the stability of the replication process. In some cases, the stability of the computational instance may be at risk, as most or all software applications executing on the platform depend on being able to access the database and use replication procedures. For example, if an software application is blocked by a large continuous database insert or delete operation, other operations necessary for keeping a computational instance running smoothly and healthy can suffer and cause service degradation of the entire instance.

Thus, the storage of difference comparisons is transient but should be permanent enough so that a user can retrieve the same results again, and apply filtering, searching, and/or sorting in ways desired to isolate and identify changes that may be the root cause of an alert. Database tables facilitate filtering, searching, and sorting, but as noted above using a database table is computationally prohibitive.

To overcome these and possibly other limitations, a merged difference snapshot can be serialized to a file in the file system of a computational instance. Filesystem I/O is typically several times faster than storing large data sets into a table in a database. Moreover, a text file of several megabytes may be compressed with typical text compression resulting in 70-80% reduction in size. Such compression and storage (e.g., to a solid-state drive) may take in total approximately 10 milliseconds and is almost instantaneous to delete.

As difference comparisons are made by pairing nodes of snapshots using paths, the merged results in the file format are grouped by the tree path, with entries containing keys and values, including values from both snapshots as well as an indicator of which of the four types of differences the node exhibits. To further reduce file size, nodes with edited differences may contains two values per key-value pair, one from each snapshot, while deleted, added, and no-change nodes contain a single value per key-value pair.

As example of this is shown in partial difference comparison file 900 of FIG. 9. Each leaf node in file 900 represents a key-value pair, and is annotated with comments (text after the "//") indicating the type of change (if any).

Leaf nodes 902 and 904 contain two values, because they represent edits. Considered left to right, the first value is from prior to editing and the second value is from after editing. All other leaf nodes have just one value because they represent additions, deletions, or no-change scenarios.

Regardless, the resulting file is stored on the file system and related to a unique difference identifier (diff-Id). This allows the file to be retrieved and opened by its difference identifier.

B. Displaying Difference Comparisons on a User Interface

To investigate the cause of a degradation to a software service, a user may find it advantageous to observe a snapshot of configuration data that was deployed when the alert was generated (a current snapshot). With support of the difference comparison operations described above, the user can compare this snapshot to a snapshot of the configuration data that was deployed at an earlier point in time when the software service was not experiencing the degradation (a previous snapshot).

To observe differences between nodes of the current and previous snapshots, a graphical user interface may be generated to display the differences. Information from a difference comparison file may be may be presented on the graphical user interface in tabular form with columns and rows. The columns may indicate one or more of a node's path, the type of change exhibited by the node from the previous to the current snapshot, the key of the node's key-value pair, previous value of the node's key-value pair (if applicable), and new value of the node's key-value pair (if applicable). The tabular graphical user interface may also support filtering, searching, paging, and sorting its rows based on the content of its columns.

FIG. 7D depicts one possible embodiment of such a tabular graphical user interface. Pane 734 displays a root path (/Prod/release-1.0/searchService-V1.0/javaConfig.json/settings) for three nodes (this path can also be inferred from the tree-like structure of configuration data displayed in pane 732). For each node, the tabular form includes columns for an action 736 (type of change), name 738 (key of the node's key-value pair), reference snapshot value 740 (previous value of the node's key-value pair), and target snapshot value 742 (new value of the node's key-value pair). As noted above, pane 734 displays this information using a list component.

A tabular graphical user interface with rows and columns is a familiar experience to users, and familiar graphical user interfaces with familiar navigation and presentation of data increases the efficiency of a user tasked with identifying the root cause of an alert. For example, if an alert details that requests are timing-out on an infrastructure configuration item responsible for part of a software service, then a user may want to first inspect and filter results to a subtree of the configuration data containing that software service to examine the configuration data and any changes to that node and its children. A user can do this analysis more quickly and easily with a familiar tabular graphical user interface with familiar options to inspect the difference comparison results.

C. Virtual Tables

Tabular graphical user interfaces are typically populated by data stored in a database table. But for reasons discussed above, placing the difference comparison data in a database is undesirable. Thus, to serve the tabular graphical user interface in an efficient fashion that avoids the latencies associated with storing the difference comparison in a database, a virtual table construct can be used to adapt a file stored on the file system to appear and respond as though the information in the file was in a database table.

Conventionally, a list component of a graphical user interface for displaying database table entries may make API calls to a backend web service of a web server. These API calls may specify a table name, columns of the table requested for display, a sort order, a limit on the number of entries returned, a page number, and potentially filters based on values appearing in one or more of the columns. The backend web service may invoke another layer of software such as an object relational mapper (ORM) to produce a database query (e.g., SQL) to the database table. This query may then be sent through a database driver of the web server.

This database driver may be a further layer of software that handles low-level communications between the web server and a database server. Thus, it may create a connection to the database server, provide the query in the format the database server recognizes, receive the results provided by the database server on the network, and then return those results to the ORM layer. The web server then formats the results in accordance to the list component of the graphical user interface, and displays the results in the list component. These layers work together due to standards, defined communication protocols, and software interfaces that allow each layer to interoperate with other layers that implement these same interfaces, protocols and standards.

The ORM can support multiple types of databases by employing more than one database driver. For instance, there may be one database driver for MySQL databases, and another for Postgres databases. Each database driver may use a specific communication protocol and query format tailored for its type of database. Nonetheless, the web server's graphical user interface module is unaware of how the web service obtained the results, the web service is unaware of how the ORM layer obtained the results, and the ORM is unaware of how the database driver obtained the results. What matters to each of these modules is that they can communicate and interoperate with other modules according to defined interfaces.

When data is stored in a table that is not a conventional database table, there is no database to handle queries related to that table. Nonetheless, a web service may still accept a query from a list component of a graphical user interface, and the web service may still call the ORM to provide results back to the web service. Instead of providing a query to a database driver, the ORM may recognize that the table name being queried is not a database table and instead call an alternate layer of software implementing a driver to a virtual table in non-persistent, volatile memory, such as RAM.

Figure 10:
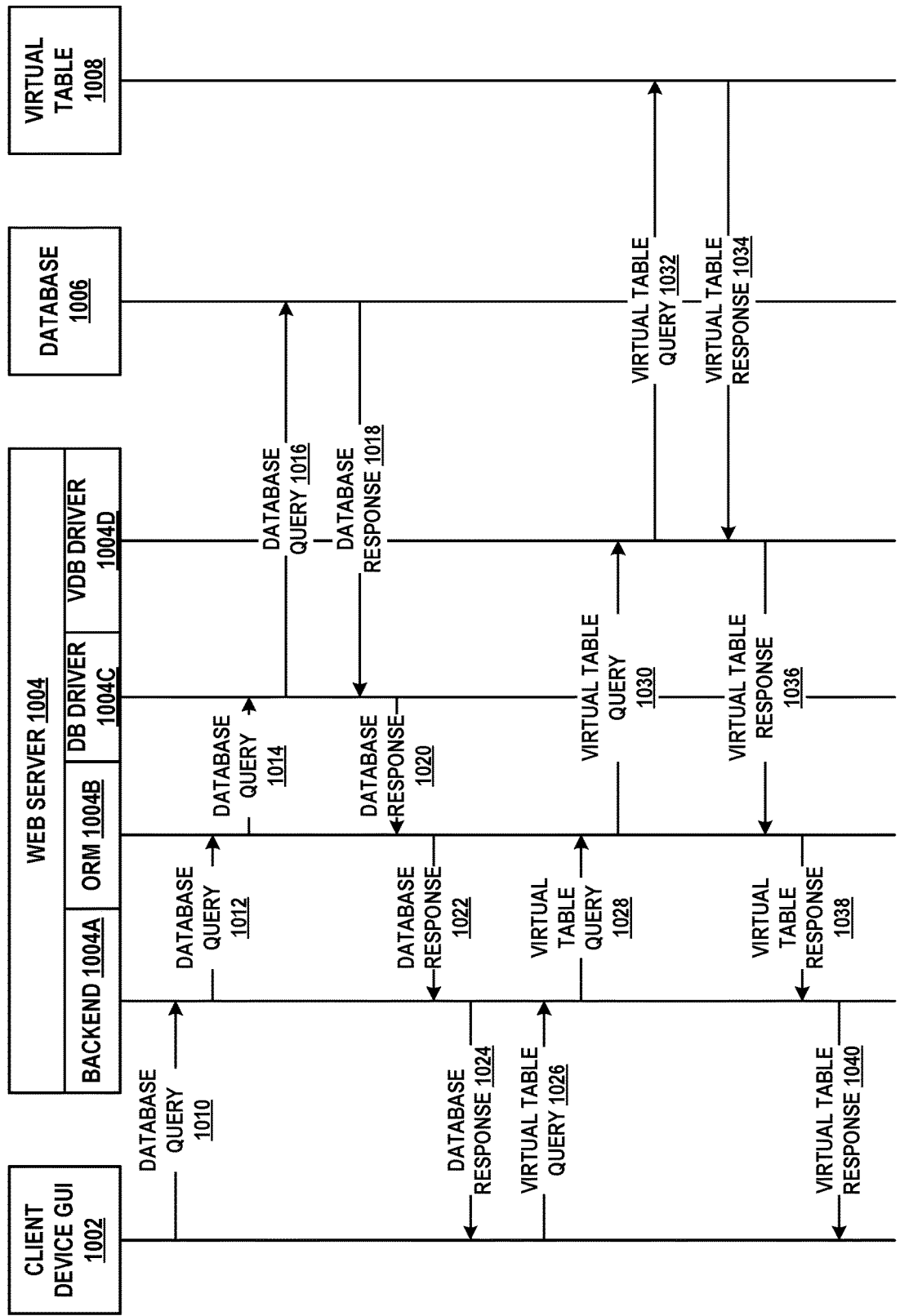
FIG. 10 depicts a message flow diagram for populating a graphical user interface with data from either a database or a virtual table, in accordance with example embodiments.

Such an arrangement is depicted in FIG. 10. Client device graphical user interface 1002 is in communication with web server 1004. When the client device is provided with a list component that indicates that it would be populated with data from database 1006 (e.g., a MySQL database) or virtual table 1008, the client device may make a corresponding query to web server 1004. Notably, the client device and web server 1004 may be separate and distinct computing devices that communication over a network such as the Internet. Further, database 1006 may also be a separate and distinct computing device that communicates with web server 1004 over a network. Virtual table 1008 may be stored in RAM of web server 1004 or that of a yet another separate and distinct computing device. Other possibilities exist. As noted above, client device graphical user interface 1002 and possibly parts of web server 1004 may not be aware of whether they are ultimately querying a virtual table instead or an actual database table.

Steps 1010-1024 illustrate how a query for data from database 1006 and its corresponding response flow through the modules of web server 1004. At step 1010, client device graphical user interface 1002 may transmit a database query to backend web service 1004A. At step 1012, backend web service 1004A may identify this query as relating to a database and provide it to ORM 1004B. At step 1014, ORM 1004B may identify this query as relating to database 1006 and provide it to database driver 1004C. At step 1016, database driver 1004C may translate the query into a format compatible with database 1006 and then transmit the query to database 1006. At step 1018, database 1006 may transmit the response to the query to database driver 1004C. At step 1020, database driver 1004C may translate the response into a format compatible with ORM 1004B and then provide the response to ORM 1004B. At step 1022, ORM 1004B may provide the response to backend web service 1004A. At step 1024, backend web service 1004A may provide the response to client device graphical user interface 1002. In turn, and not shown in FIG. 10, client device graphical user interface 1002 may use the response to populate the list component.

Steps 1026-1040 illustrate how a query for data from virtual table 1008 and its corresponding response flow through the modules of web server 1004. At step 1026, client device graphical user interface 1002 may transmit a virtual table query to backend web service 1004A. At step 1028, backend web service 1004A may identify this query as relating to a virtual table and provide it to ORM 1004B. At step 1030, ORM 1004B may identify this query as relating to virtual table 1008 and provide it to virtual database driver 1004D. At step 1032, virtual database driver 1004D may translate the query into a format compatible with virtual table 1008 and then transmit the query to virtual table 1008. At step 1034, virtual table 1008 may transmit the response to the query to virtual database driver 1004D. At step 1036, virtual database driver 1004D may translate the response into a format compatible with ORM 1004B and then provide the response to ORM 1004B. At step 1038, ORM 1004B may provide the response to backend web service 1004A. At step 1040, backend web service 1004A may provide the response to client device graphical user interface 1002. In turn, and not shown in FIG. 10, client device graphical user interface 1002 may use the response to populate the list component.

D. Block-Based Retrieval and User Interface Pagination

As noted above, virtual table 1008 may be stored in RAM. RAM capacity is typically several orders of magnitudes smaller than persistent storage such as a hard drive or solid-state drive, and RAM may also be shared by other virtual tables, applications, processes and operating system running on a computing system such as web server 1004. Therefore, while a database can be maintained in persistent storage and can grow into the billions of entries, a virtual table in shared volatile memory may have access to a significantly smaller amount of memory, and only have the capacity for limited number of entries, for example 1000 entries. Furthermore, an entry limit (e.g., 1000) may be enforced by the virtual table driver. Here, an entry in the virtual table corresponds to a node of the configuration data (e.g., a node in a difference comparison of two snapshots) and may be displayed in a row of the list component.

Given that a difference comparison of two snapshots of configuration data could have several times as many entries (e.g., tens of thousands) as can be reasonably stored in RAM, it is desirable to be able to fetch a "block" of entries at a time from virtual table 1008 and store these entries in RAM for at least some of the time that they are being displayed to the user. For example, suppose that the entry limit is 1000 and a difference comparison that is stored in a filesystem contains 10,000 entries. In this case, there are 10 blocks of 1000 entries each. Thus, entries 0-999 make up the first block (block 0), entries 1000-1999 make up the second block (block 1), and so on. In various embodiments, a block number and/or another set of identifiers may be used to identify the desired block.

To facilitate being able to display these entries on the client graphical user interface, a custom block retrieval mechanism may be used. Doing so involves adding new columns to the virtual table. The columns, rather than providing just data that is read out of the virtual table, serve as additional parameters into the software layer producing the virtual table entries. These additional columns in the virtual table may include a diff-Id, a block number, a number of entries per block, and possibly other information. The software layer may be configured to add filter conditions based on these additional columns. Such filter conditions might not be used to filter the data returned by the virtual table, but instead serve as part of the queries to the virtual table.

Here, a diff-Id refers to a difference comparison between two snapshots stored in one or more files in persistent storage. For instance, there may be a one-to-one mapping between diff-Ids and file, or a single diff-Id may refer to a large difference comparison split across multiple files. In the latter case, a B-tree (binary tree) index could be in the header of the first file or a separate file, and would be used to determine to the correct file from which to serve a request. In other words, the B-tree would serve as an index to identify which file(s) and/or block regions in the file(s), and the resulting block(s) may contain some entries from each of more than one file. Another possibility is multiple redundant files relating to the same diff-Id in persistent storage, each with a different internal structure arranged or a specific data traversal procedure, such as pre-grouped, pre-filtered, or pre-sorted results. This would allow certain types of requests (e.g., for a particular grouping, filtering, or sorting of the results) to be provided more rapidly.

With these filter conditions, a query provided by the ORM can identify a particular diff-Id, a particular block number within that diff-Id, and the particular block size of blocks within that diff-Id. With this information, the virtual database driver can locate the particular diff-Id in persistent storage, iterate through the diff-Id based on the particular block size until the start of the particular block is found, and then return the appropriate number of entries. As an example, if the query indicates that the block size is 1000 entries and that the second block is requested, the virtual database driver can return entries 1000-1999 of the specified diff-Id. Notably, a retrieved block may not always be sequentially loaded and from the same region of the file on the filesystem, because a different request for the block may also include additional filters and/or sorting conditions that modify how the block is identified for that request.

Figure 11:
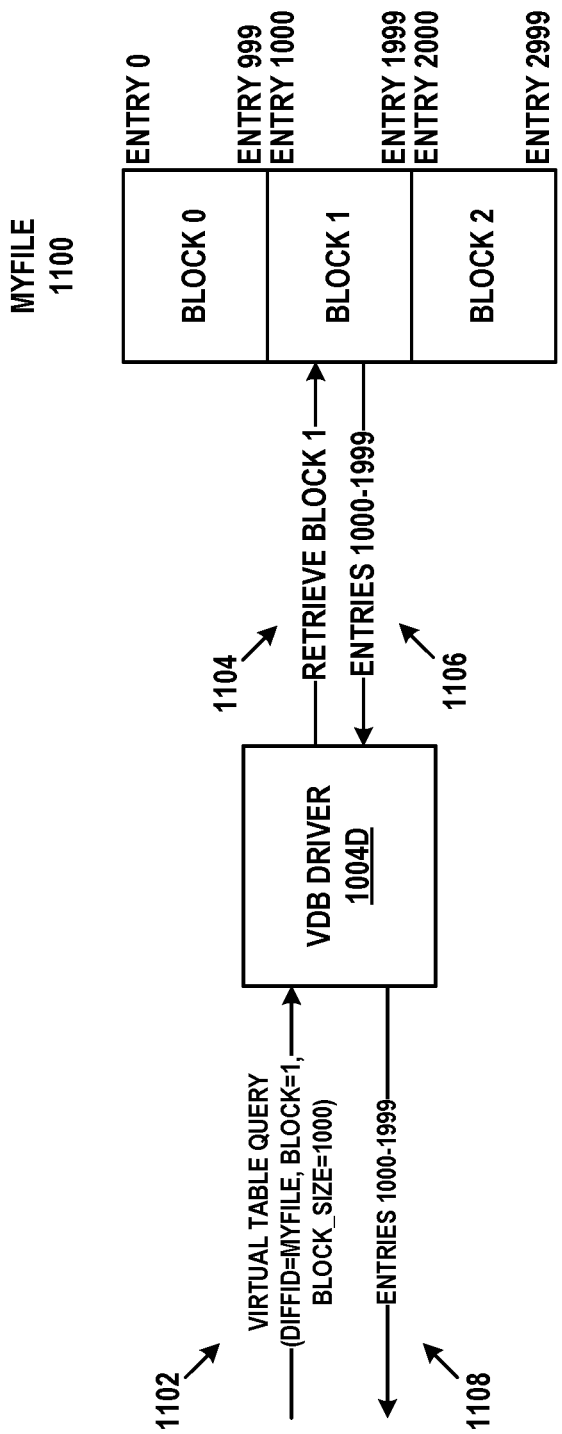
FIG. 11 depicts a virtual database driver reading a block from a file, in accordance with example embodiments.

This scenario is illustrated in FIG. 11. It is assumed that myfile 1100 exists in a local or remote filesystem accessible to virtual database driver 1004D. At step 1102, virtual database driver 1004D receives a query specifying a diff-Id of "myfile", a block number of 1, and a block size of 1000. The query may have come from ORM 1004B, for example. In some cases, the block size is not included in the query, as it may be a fixed setting for virtual database driver 1004D. At step 1104, virtual database driver 1004D locates myfile in a filesystem (local or remote), and uses the block number and block size to identify and retrieve entries 1000-1999 that make up block 1 (the second block) of myfile. In the case that filters and/or sorting is to be applied to one or more "columns" of the entries (e.g., node path, action, name, previous value, current value), the data in the file is filtered and/or sorted accordingly before the entries are identified. At step 1106, virtual database driver 1004D receives these entries. At step 1108, virtual database driver 1004D provides these entries in response to the query.

In these embodiments, the interfaces for the list component, the backend web service and ORM remain the largely same as they were for a query to a conventional database table. Maintaining these interfaces without significant changes facilitates backwards compatibility without a reduced risk of introducing defects.

Additionally, for sake of user convenience and system performance, user interface components (such as the list component) typically do not display a limitless number of entries at a time. For example, the entries may be paginated by the list component so that only a small, fixed number are displayed on the client device graphical user interface at a time (e.g., 10, 25, 50, 100, etc.). Thus, for a block size of 1000, the list component may display any one of 10 pages of 100 entries each.

In various embodiments, pagination interacts with the loaded block when there are more entries than can be loaded into the block. The max of 1000 entries of the block (for example) maybe be reloaded/replaced to handle the next graphical user interface request to paginate past the first 10 pages of 100, if such additional entries exist in the diff-Id. In practice, the block can be reloaded in virtual table memory for each stateful transaction (though multiple requests at the same time from one or many users would not get co-mingled), and/or as needed for the graphical user interface request. Even when limited to 1000 entries per block, the pagination control may independently know that there is a greater number of entries, such as 10,000, and does not limit the page options in the graphical user interface to the first 10 pages of 100 only. Thus, selecting page 11 reloads a different block into virtual table memory. Additionally, the virtual table driver may understand the graphical user interface is only displaying 100 entries at the time in the list (requested size of block), and may just load the 100 entries needed for that graphical user interface transaction rather than continue to fill the memory up to the max 1000 entry memory limit.

With the custom pagination control, some embodiments may avoid reading the total count of entries through the normal channels of backend web service 1004A/ORM 1004B/virtual database driver 1004D. Instead, the custom pagination control may query a different web service (e.g., a pagination backend service) that is able to produce the total count of entries for the current list filter, calculate the number of pages, and keep track of the current page that the user is viewing.

The pagination service may receive a diff-Id, various filter and filter values currently active in the list component, and/or list page size currently used in the list component as inputs. These inputs refresh and cause another pagination service call whenever any of them changes in the graphical user interface. In exchange, the pagination control provides the currently selected page to the list component for the list's query to the backend, and also resets to page 1 when inputs change. The pagination service may determine file(s) from the diff-Id and apply the filters. Then, rather than load entries into the virtual table memory, the pagination service may get the full count of filtered entries by invoking an iterative count. The pagination service then divides the total count of entries by the list page size input, rounding up, and returns total count (with any filters applied) and this rounded up number of pages.

Figure 12:
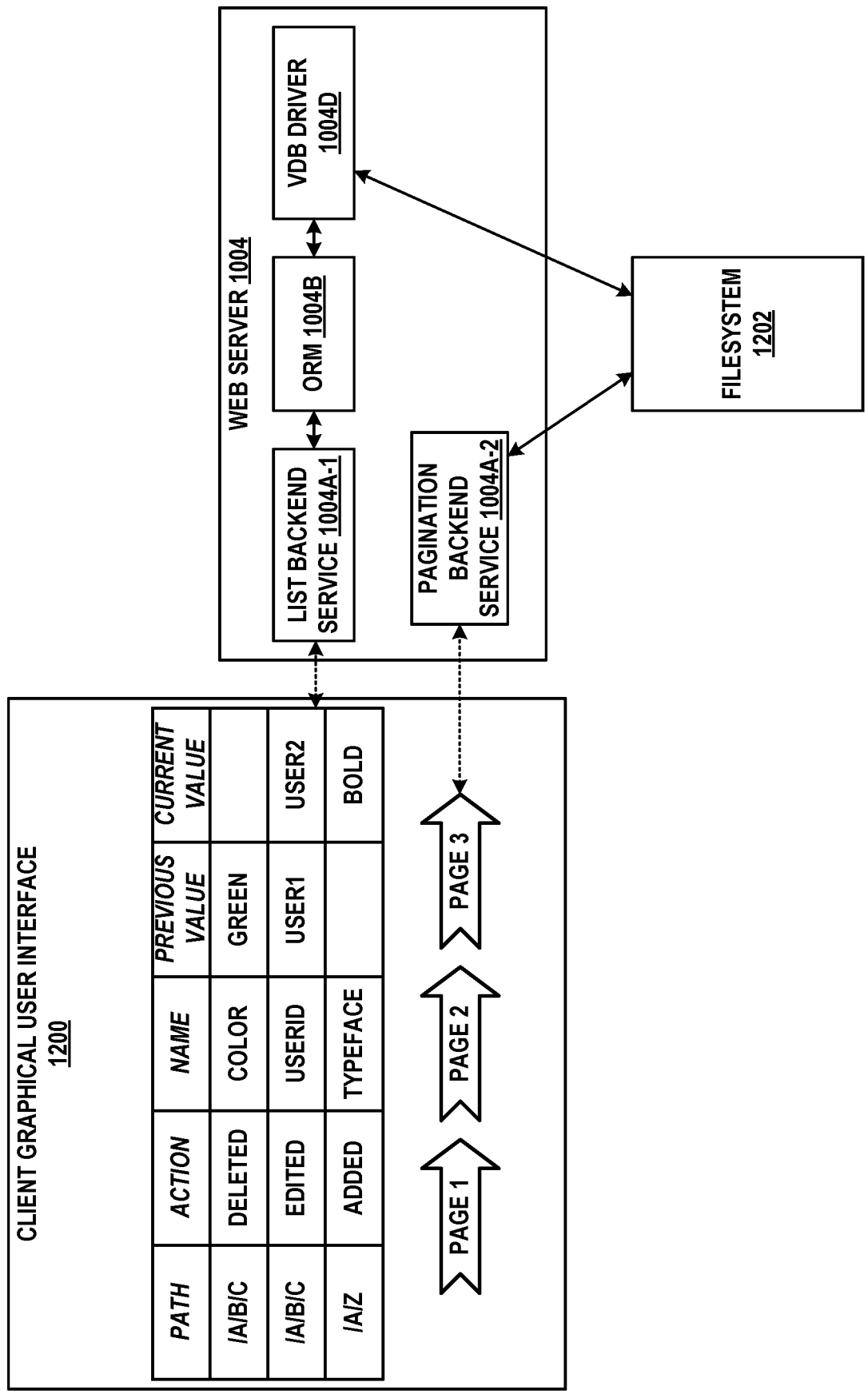
FIG. 12 depicts a web server backend with custom pagination control, in accordance with example embodiments.

An example is shown in FIG. 12. Client graphical user interface 1200 displays difference comparison information in a list component. This information is retrieved by way of list backend service 1004A-1, ORM 1004B, and virtual database driver 1004D of web server 1004. As depicted, virtual database driver 1004D retrieves blocks of the relevant diff-Id (file) into main memory from filesystem 1202. A parallel channel exists in which the list component communicates with pagination backend service 1004A-2. Pagination backend service 1004A-2 determines, from the block currently in main memory and/or blocks of the diff-Id (file) stored in filesystem 1202, the number of pages and/or the current page number to display or emphasize on client graphical user interface 1200.

E. Example Operations

Figure 13:
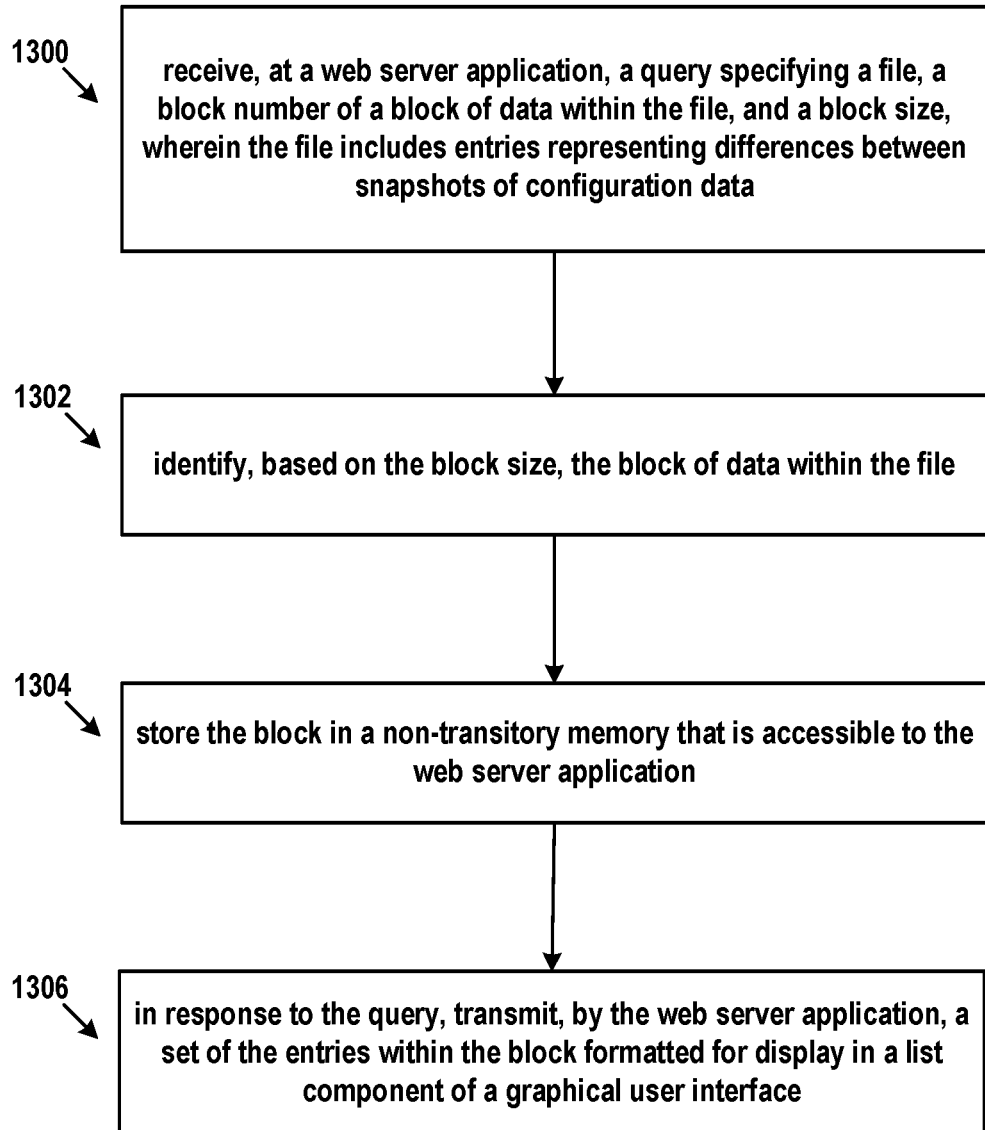
FIG. 13 is a flow chart, in accordance with example embodiments.

FIG. 13 is a flow chart illustrating an example embodiment. The process illustrated by FIG. 13 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 13 may be simplified by the removal of any one or more of the features shown therein. Further, these embodiments may be combined with features, aspects, and/or implementations of any of the other figures or otherwise described herein.

Block 1300 may involve receiving, at a web server application, a query specifying a file, a block number of a block of data within the file, and a block size, wherein the file includes entries representing differences between snapshots of configuration data.

Block 1302 may involve identifying, based on the block size, the block of data within the file.

Block 1304 may involve storing the block in a non-transitory memory that is accessible to the web server application.

Block 1306 may involve, in response to the query, transmitting, by the web server application, a set of the entries within the block formatted for display in a list component of a graphical user interface.

In some embodiments, the file is of one or more files that contain the entries.

In some embodiments, identifying the block of data within the file comprises iterating, based on the block size, through the file until the block is located.

In some embodiments, the query also specifies a filter to apply to the entries. These embodiments may further involve, before iterating through the file, applying the filter to the entries. In practice, the filter may be applied but lazy-evaluated as part of the iteration loop. This is so that the entire file does not always need to be iterated and filtered to the end of the file, for instance if the block limit is reached first during iteration before filtering the entire file. The process could be: read an entry, test the filter on the entry, keep or dispose the entry, then iterate to the next entry. At this level of granularity, the filter is applied before each iteration step, but all filtering is not completed before iteration begins. This is in contrast to sorting, where all sorting must be completed before iteration begins, or else iteration happens on unsorted entries.

In some embodiments, the query also specifies a sorting operation to apply to the entries. These embodiments may further involve, before iterating through the file, applying the sorting operation to the entries.

In some embodiments, the set of the entries contains one or more of the entries. In some cases, an empty set could be returned when the filters have filtered every possible entry out, or due to snapshots being of empty trees and the comparison producing an empty file.

In some embodiments, the file is specified by a unique identifier that is associated with differences between two specific snapshots of the configuration data.

In some embodiments, the list component displays the set of entries in a tabular form with pagination buttons to load and display other sets of entries within the block.

The embodiments may further involve: receiving, at the web server application, a further query to load a further set of entries in the list component; determining that the further set of entries includes an entry that is within a further block of the file; identifying, based on the block size, the further block within the file; storing the further block in the non-transitory memory; and in response to the further query, transmitting, by the web server application, the entry that is within the further block formatted for display in the list component.

In some embodiments, storing the further block into the non-transitory memory comprises replacing the block with the further block.

In some embodiments, each of the entries relates to a configurable setting within the configuration data and contains a path, an action, a name, and one or both of a previous value of the configuration setting from a previous snapshot of the snapshots and a current value of the configurable setting from a current snapshot of the snapshots.

In some embodiments, transmitting the set of the entries within the block formatted for display in the list component comprises populating, for each of the entries, its respective path, respective action, respective name, and one or both of its respective previous value and respective current value in a row of the list component.

In some embodiments, a particular entry of the entries contains a particular action indicating that the configurable setting has been added, wherein the previous value is null and the current value is not null.

In some embodiments, a particular entry of the entries contains a particular action indicating that the configurable setting has been removed, wherein the previous value is not null and the current value is null.

In some embodiments, a particular entry of the entries contains a particular action indicating that the configurable setting has been edited, wherein the previous value is not null and the current value is not null.

In some embodiments, the file is used in place of storing the entries in a database structure.

In some embodiments, the non-transitory memory is a volatile main memory.

In some embodiments, the block size is between 100 and 5000 of the entries.

VIII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
in response to determining that a software service satisfies a degradation criterion, generating an alert that indicates the software service and a change request specifying that configuration data used by the software service was changed in a current snapshot of the configuration data;
based on the change request, determining a set of configuration changes between the current snapshot and a previous snapshot of the configuration data; and
providing a representation of the set of configuration changes indicating one or more parameters that were changed in the current snapshot and one or more paths in a tree-based arrangement of the configuration data that lead to the one or more parameters that were changed in the current snapshot.

2. The method of claim 1, wherein determining the set of configuration changes between the current snapshot and the previous snapshot of the configuration data is in response to receiving a selection of the current snapshot and the previous snapshot.

3. The method of claim 1, wherein the software service is supported by one or more software applications, and wherein the one or more parameters that were changed in the current snapshot of the configuration data are used by the one or more software applications.

4. The method of claim 1, wherein determining that the software service satisfies the degradation criterion comprises detecting one or more of: an outage impacting the software service, reduced performance of the software service, or processor or memory utilization exceeding a threshold value.

5. The method of claim 1, wherein the alert is one of a plurality of alerts, stored in an alert database, related to detected technical problems affecting one or more of a plurality of software services.

6. The method of claim 1, further comprising:
providing, to a client device by way of a graphical user interface, a representation of the alert that specifies the software service and the change request.

7. The method of claim 6, wherein determining the set of configuration changes comprises:
providing, to the client device, an adjustable timeline of a plurality of snapshots including the current snapshot and the previous snapshot of the configuration data;
receiving, from the client device, a further selection of the current snapshot and the previous snapshot; and
determining, as the one or more parameters, those that were changed between the previous snapshot and the current snapshot.

8. The method of claim 1, wherein each of the one or more parameters that were changed in the current snapshot of the configuration data is represented as a key-value pair comprising a key that uniquely identifies a respective parameter and a value of the respective parameter.

9. The method of claim 1, wherein each of the one or more parameters that were changed in the current snapshot of the configuration data is marked as either being newly added to the configuration data, removed from the configuration data, or edited within the configuration data.

10. The method of claim 1, wherein the representation of the set of configuration changes also indicates additional parameters that were not changed in the current snapshot of the configuration data.

11. The method of claim 1, wherein the current snapshot of the configuration data is deployed in a production environment, and wherein the previous snapshot is a snapshot of the configuration data that was most recently deployed in the production environment prior to deployment of the current snapshot.

12. A non-transitory computer-readable medium storing program instructions that, when executed by one or more processors of a computing system, cause the computing system to perform operations comprising:
in response to determining that a software service satisfies a degradation criterion, generating an alert that indicates the software service and a change request specifying that configuration data used by the software service was changed in a current snapshot of the configuration data;
based on the change request, determining a set of configuration changes between the current snapshot and a previous snapshot of the configuration data; and
providing a representation of the set of configuration changes indicating one or more parameters that were changed in the current snapshot and one or more paths in a tree-based arrangement of the configuration data that lead to the one or more parameters that were changed in the current snapshot.

13. The non-transitory computer-readable medium of claim 12, wherein determining the set of configuration changes between the current snapshot and the previous snapshot of the configuration data is in response to receiving a selection of the current snapshot and the previous snapshot.

14. The non-transitory computer-readable medium of claim 12, wherein the software service is supported by one or more software applications, and wherein the one or more parameters that were changed in the current snapshot of the configuration data are used by the one or more software applications.

15. The non-transitory computer-readable medium of claim 12, wherein determining that the software service satisfies the degradation criterion comprises detecting one or more of: an outage impacting the software service, reduced performance of the software service, or processor or memory utilization exceeding a threshold value.

16. The non-transitory computer-readable medium of claim 12, wherein the alert is one of a plurality of alerts, stored in an alert database, related to detected technical problems affecting one or more of a plurality of software services.

17. The non-transitory computer-readable medium of claim 12, the operations further comprising:
providing, to a client device by way of a graphical user interface, a representation of the alert that specifies the software service and the change request, wherein determining the set of configuration changes comprises:
providing, to the client device, an adjustable timeline of a plurality of snapshots including the current snapshot and the previous snapshot of the configuration data;
receiving, from the client device, a further selection of the current snapshot and the previous snapshot; and
determining, as the one or more parameters, those that were changed between the previous snapshot and the current snapshot.

18. The non-transitory computer-readable medium of claim 12, wherein each of the one or more parameters that were changed in the current snapshot of the configuration data is represented as a key-value pair comprising a key that uniquely identifies a respective parameter and a value of the respective parameter.

19. The non-transitory computer-readable medium of claim 12, wherein each of the one or more parameters that were changed in the current snapshot of the configuration data is marked as either being newly added to the configuration data, removed from the configuration data, or edited within the configuration data.

20. A computing system comprising:
one or more processors;
memory; and
program instructions, stored in the memory, that upon execution by the one or more processors cause the computing system to perform operations comprising:

in response to determining that a software service satisfies a degradation criterion, generating an alert that indicates the software service and a change request specifying that configuration data used by the software service was changed in a current snapshot of the configuration data;

based on the change request, determining a set of configuration changes between the current snapshot and a previous snapshot of the configuration data; and providing a representation of the set of configuration changes indicating one or more parameters that were changed in the current snapshot and one or more paths in a tree-based arrangement of the configuration data that lead to the one or more parameters that were changed in the current snapshot.

* * * * *